US012665291B2

(12) United States Patent
Leizerovich

(10) Patent No.: US 12,665,291 B2
(45) Date of Patent: Jun. 23, 2026

(54) SMART SENSOR DEVICE AND ANTENNA STRUCTURE FOR USE THEREWITH

(71) Applicant: UBICQUIA, INC., Fort Lauderdale, FL (US)

(72) Inventor: Gustavo Dario Leizerovich, Aventura, FL (US)

(73) Assignee: Ubicquia, Inc., Fort Lauderdale, FL (US)

( * ) Notice: Subject to any disclaimer, the term of this patent is extended or adjusted under 35 U.S.C. 154(b) by 230 days.

(21) Appl. No.: 18/375,413

(22) Filed: Sep. 29, 2023

(65) Prior Publication Data

US 2024/0030594 A1     Jan. 25, 2024

Related U.S. Application Data

(62) Division of application No. 18/090,218, filed on Dec. 28, 2022, which is a division of application No.
(Continued)

(51) Int. Cl.
H01Q 1/44          (2006.01)
G01J 1/02          (2006.01)
(Continued)

(52) U.S. Cl.
CPC .............. H01Q 1/42 (2013.01); G01J 1/0271 (2013.01); H01Q 1/225 (2013.01); H01Q 1/38 (2013.01); H01Q 1/44 (2013.01); H05B 47/19 (2020.01)

(58) Field of Classification Search
CPC ............ H01Q 1/42; H01Q 1/225; H01Q 1/38; H01Q 1/44; H01Q 9/42; H01Q 21/28
See application file for complete search history.

(56) References Cited

U.S. PATENT DOCUMENTS 5,634,209 A * 5/1997 Prudhomme ....... B60R 11/0241
                                                        343/807
7,193,567 B1    3/2007 Ryken, Jr. et al.
(Continued)

FOREIGN PATENT DOCUMENTS

WO          2019175437 A1     9/2019

OTHER PUBLICATIONS

Korean Intellectual Property Office as International Searching Authority, International Search Report issued in connection with grandparent application's counterpart International Application No. PCT/US2021/024758, Jul. 20, 2021, 4 pages.
(Continued)

*Primary Examiner* — David E Lotter
(74) *Attorney, Agent, or Firm* — Daniel C. Crilly

(57)          ABSTRACT

An antenna for a smart sensor device includes a generally circular, substantially rigid substrate and a radiative antenna element integrated with the substrate. According to one embodiment, the antenna element is a primary cellular antenna arranged to pass signals at frequencies between 600 MHz and 3 GHz. According to another embodiment, a second radiative antenna element may be integrated with the substrate. In such a case, the second antenna element may be arranged to receive location-based signals from satellites or operate as a cellular diversity antenna arranged to receive cellular signals present in proximity to the antenna. The substrate may include at least one interruption (e.g., aperture or lens) arranged to permit light to reach an area inside the sensor device that would otherwise be shielded by the substrate. In such a case, the radiative antenna element(s) may be integrated with the substrate so as to avoid the interruption.

14 Claims, 18 Drawing Sheets

Related U.S. Application Data

17/214,600, filed on Mar. 26, 2021, now Pat. No. 11,611,144.

(60) Provisional application No. 63/001,837, filed on Mar. 30, 2020.

(51) Int. Cl.

| | | |
|---|---|---|
| *H01Q 1/22* | (2006.01) | |
| *H01Q 1/38* | (2006.01) | |
| *H01Q 1/42* | (2006.01) | |
| *H05B 47/19* | (2020.01) | |

(56) References Cited

U.S. PATENT DOCUMENTS

| | | | |
|---|---|---|---|
| 10,966,305 B2 | 3/2021 | Tublowski et al. | |
| 2013/0040471 A1 | 2/2013 | Gervais et al. | |
| 2013/0057158 A1 | 3/2013 | Josefowicz et al. | |
| 2014/0232612 A1* | 8/2014 | Jenwatanavet | H01Q 9/0421 |
| | | | 343/893 |
| 2018/0054877 A1* | 2/2018 | Creemers | H01Q 21/29 |
| 2018/0109006 A1 | 4/2018 | Ng et al. | |
| 2019/0363424 A1 | 11/2019 | Catchpole et al. | |
| 2020/0101887 A1* | 4/2020 | Cha | B60Q 1/34 |
| 2021/0095841 A1* | 4/2021 | Kulkarni | F21V 23/045 |
| 2022/0069441 A1* | 3/2022 | Kim | H01Q 1/24 |

OTHER PUBLICATIONS

Korean Intellectual Property Office as International Searching Authority, Written Opinion of the International Searching Authority issued in connection with grandparent application's counterpart International Application No. PCT/US2021/024758, Jul. 20, 2021, 5 pages.

* cited by examiner

SMART SENSOR DEVICE AND ANTENNA STRUCTURE FOR USE THEREWITH

CROSS-REFERENCE TO RELATED APPLICATIONS

The present application is a division of U.S. application Ser. No. 18/090,218, which was filed on Dec. 28, 2022, and is incorporated herein by reference in its entirety. application Ser. No. 18/090,218 is a division of U.S. application Ser. No. 17/214,600, which was filed on Mar. 26, 2021, and is incorporated herein by reference in its entirety. application Ser. No. 17/214,600 claims priority upon and the benefit of U.S. Provisional Application No. 63/001,837, which was filed on Mar. 30, 2020, and is incorporated herein by reference in its entirety.

TECHNICAL FIELD

The present disclosure relates generally to light sensing devices with wireless communication capability and, more particularly, to a light sensing device and an antenna structure for use therewith.

BACKGROUND

Streetlights, when they are operating properly, will illuminate a roadway, parking lot, or any other area during the night, in the absence of daylight, and at other desirable times. Oftentimes, a streetlight is desirably turned "on" in the evening as darkness approaches and turned "off" in the morning after daylight has arrived. Streetlight controllers have been known for many years. A conventional streetlight controller includes an electronic light sensor. The light sensor generates an output signal that indicates an amount or intensity of light proximal to the sensor. The output from the light sensor may in some cases indicate the intensity of proximal light. Additionally, or alternatively, the light sensor, asserts or de-asserts an output signal based on a light intensity threshold. If the light intensity is below a threshold, the conventional streetlight controller will direct the streetlight to turn "on" and provide visible light; else, the controller will direct the streetlight to turn "off"

In recent years, so-called "smart" streetlight controllers have been created. A smart streetlight controller provides wireless communication capabilities, which permit the streetlight to report certain status to a remote computing device. In at least some cases, a smart streetlight controller may further be arranged to receive control information from a remote computing device. The received control information may direct the streetlight to turn on, turn off, illuminate at a particular color or intensity, and perform some other function. One exemplary smart streetlight controller may be arranged according to published PCT patent application WO 2019/136480 A2, which describes a light pole wireless networking device. Some other aspects of wireless networking device technologies and related art that may be useful in understanding the background of the present disclosure are described in the following publications:

Published PCT patent application WO 2019/136474 A2, which describes a system that captures and analyzes a last known state across a plurality of dispersed geographic sensors synchronized to a common clock;

Published PCT patent application WO 2019/136481 A2, which describes failure modeling and management of an aerial light fixture;

Published PCT patent application WO 2019/136482 A2, which describes an aerially lighting fixture connector;

Published PCT patent application WO 2019/136483 A2, which describes a plurality of camouflaged small cell networking devices;

Published PCT patent application WO 2019/136486 A2, which describes an aerially mounted wireless networking device antenna system; and Published PCT patent application WO 2019/136488 A2, which describes a distributed computing environment via a plurality of regularly spaced, aerially mounted wireless smart sensor networking devices.

The disclosures of all references mentioned above and throughout the specification, as well as the disclosures of all references mentioned in those references, are hereby incorporated herein by reference.

The antenna systems disclosed in the above-referenced publications are not configured to permit a photosensor or other circuitry that detects, senses, or uses light (e.g., sunlight or moonlight) during operation to be placed under them, such as in a stacked printed circuit board arrangement, without significantly inhibiting the photosensor's or other circuitry's ability to function properly.

All of the subject matter discussed in the Background section is not necessarily prior art and should not be assumed to be prior art merely as a result of its discussion in the Background section. Along these lines, any recognition of problems in the prior art discussed in the Background section or associated with such subject matter should not be treated as prior art unless expressly stated to be prior art. Instead, the discussion of any subject matter in the Background section should be treated as part of the inventor's approach to the particular problem, which, in and of itself, may also be inventive.

BRIEF SUMMARY

The following is a summary of the present disclosure to provide an introductory understanding of some features and context. This summary is not intended to identify key or critical elements of the present disclosure or to delineate the scope of the disclosure. This summary presents certain concepts of the present disclosure in a simplified form as a prelude to the more detailed description that is later presented.

According to one exemplary embodiment, the present disclosure describes a sensor device, such as a light sensing device, According to one exemplary embodiment of the present disclosure, a sensor device (such as, for example, a light sensing device that may be employed as a streetlight controller) includes a housing, a substrate positioned within the housing, one or more radiative antenna elements positioned upon or otherwise integrated with a first surface of the substrate, and a processing section positioned within the housing in a stacked arrangement with the substrate such that the processing section is located opposite, but not in physical contact with, a second surface of the substrate. The substrate includes or defines one or more interruptions configured to allow light entering the housing to pass through the substrate from the first surface thereof through the second surface thereof. The second surface of the substrate is parallel to the first surface of the substrate and separated from the first surface of the substrate by a thickness of the substrate. Each radiative antenna element is positioned upon or otherwise integrated with the first surface of the substrate so as to avoid the one or more interruptions.

The processing section includes light-responsive circuitry and is configured such that the light-responsive circuitry is positioned so as to receive at least some of the light entering the housing through the one or more interruptions.

According to another exemplary embodiment of the present disclosure, the one or more interruptions in the substrate are one or more apertures defined by the substrate and/or one or more lenses integrated into or connected to the substrate. The substrate may also or alternatively be formed or fabricated from a light-transmissive material.

According to yet another exemplary embodiment of the present disclosure, the light-responsive circuitry may be a photosensor and the one or more interruptions in the substrate may be one or more apertures sized and shaped to provide the photosensor a field of view in the range of about 90 to about 120 degrees.

According to further exemplary embodiment of the present disclosure, a transverse axis through a center of the substrate generally aligns with a longitudinal axis through a center of the housing when the substrate and the processing section are in their stacked arrangement.

According to another exemplary embodiment of the present disclosure, the sensor device may further include a power supply section that provides direct current power for use by at least the processing section, a first set of shield contacts positioned about a periphery of the processing section and electrically connected to ground, a second set of shield contacts positioned about a periphery of the power supply section and electrically connected to ground, and an electromagnetic field (EMF) shield electrically connected to the first set of shield contacts and the second set of shield contacts.

According to further exemplary embodiment of the present disclosure, the sensor device housing may be generally cylindrical, and the antenna-supporting substrate may be generally circular. In such a case, the antenna-supporting substrate may be rigid or substantially rigid and have a thickness in the range of about 50 mils (0.05 in.) to about 500 mils (0.5 in. or one-half inch). The antenna-supporting substrate may further have a radius in the range of about three-fourths of an inch (0.75 in. or 750 mils) to about four inches (4 in.).

According to another exemplary embodiment of the present disclosure, a sensor device includes a housing, a substrate positioned within the housing, one or more radiative antenna elements positioned upon or otherwise integrated with a first surface of the substrate, and a processing section positioned within the housing in a stacked arrangement with the substrate such that the processing section is located opposite, but not in physical contact with, a second surface of the substrate. According to this embodiment, the substrate defines one or more apertures sized and shaped to allow light entering the housing to pass through the substrate from the first surface thereof through the second surface thereof. The second surface of the substrate is parallel to the first surface of the substrate and separated from the first surface of the substrate by a thickness of the substrate. Each radiative antenna element is positioned upon or otherwise integrated with the first surface of the substrate so as to avoid the one or more apertures in the substrate. The processing section includes a photosensor and is configured such that the photosensor is positioned so as to receive at least some of the light entering the housing through the one or more apertures. The one or more apertures may be sized and shaped to provide the photosensor a field of view in the range of about 90 to about 120 degrees.

According to further exemplary embodiment, the device, method, and system embodiments described in this disclosure may disclose a circular antenna for use in a device that controls the operation of a streetlight. In such an embodiment, the streetlight controller may be arranged in a generally cylindrical housing having a base with integrated connector "pins" that mate with a corresponding receptacle, which receptacle is integrated in a streetlight, a luminaire, a control box, or some other structure. In cases where the streetlight controller provides wireless communication features, embodiments of the antenna structures described herein may be suitably arranged in the cylindrical housing. The substrate of the antenna structure may be formed to provide mechanical stability to the electronic component structures of the streetlight controller. The substrate may be formed as a platform that supports one or more radio frequency (RF) antenna components. The substrate of the antenna structure may be formed as a "donut" with a "hole" that permits ambient light to reach light-responsive circuitry (e.g., a photosensor) mounted below the antenna structure. Other features, benefits, and utilitarian effects of the antenna and sensor device embodiments described herein will be evident from the present disclosure.

This Brief Summary has been provided to describe certain concepts in a simplified form that are further described in more detail in the Detailed Description. The Brief Summary does not limit the scope of the claimed subject matter, but rather the words of the claims themselves determine the scope of the claimed subject matter.

BRIEF DESCRIPTION OF THE DRAWINGS

Non-limiting and non-exhaustive embodiments are described with reference to the following drawings, wherein like labels refer to like parts throughout the various views unless otherwise specified. The sizes and relative positions of elements in the drawings are not necessarily drawn to scale. For example, the shapes of various elements are selected, enlarged, and positioned to improve drawing legibility. The particular shapes of the elements as drawn have been selected for ease of recognition in the drawings. One or more embodiments are described hereinafter with reference to the accompanying drawings in which:

FIGS. 7A-7C are an embodiment of a circular antenna from different perspectives.

DETAILED DESCRIPTION

The present disclosure may be understood more readily by reference to this detailed description and the accompanying figures. The terminology used herein is for the purpose of describing specific embodiments only and is not limiting to the claims unless a court or accepted body of competent jurisdiction determines that such terminology is limiting. Unless specifically defined herein, the terminology used herein is to be given its traditional meaning as known in the relevant art.

In the following description, certain specific details are set forth in order to provide a thorough understanding of various disclosed embodiments. However, one skilled in the relevant art will recognize that embodiments may be practiced without one or more of these specific details, or with other methods, components, materials, etc. Also, in these instances, well-known structures may be omitted or shown and described in reduced detail to avoid unnecessarily obscuring descriptions of the embodiments.

The device, method, and system embodiments described in this disclosure (i.e., the teachings of this disclosure) enable deployment of particular circular antenna embodiments. The circular antenna structures described in the present disclosure may be included in certain streetlight controller embodiments. In other cases, the circular antennas may be formed, integrated, or otherwise used for different devices that perform wireless communications such as traffic light controllers, signage or sign controllers, access points, repeaters, emergency service devices, small cells, and many other devices. In many of these cases, the device containing the circular antenna is an aerially mounted device arranged for wireless communications.

Figure 1:
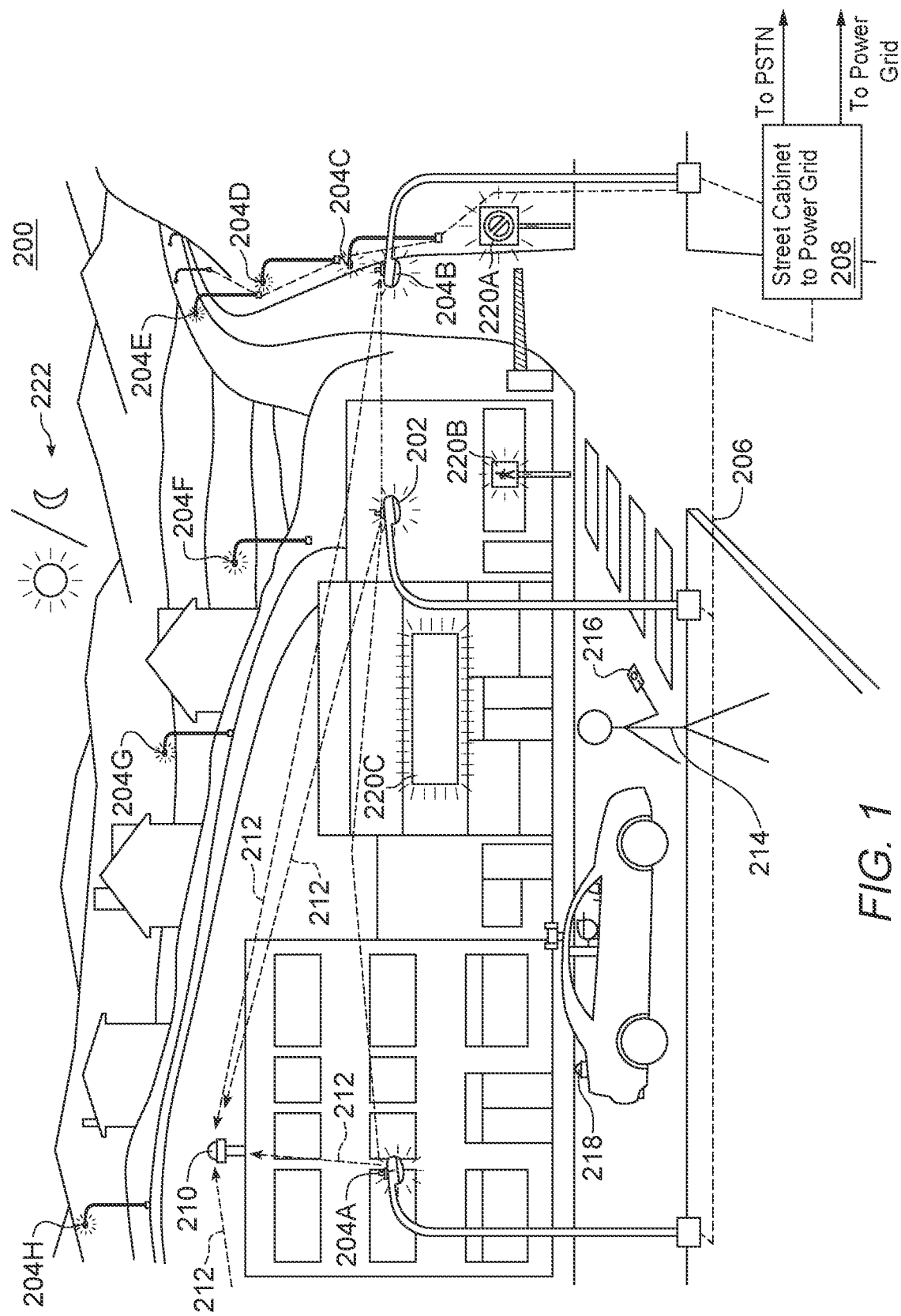
FIG. 1 illustrates an exemplary system level deployment having at least one smart streetlight controller having circular antenna embodiments.

FIG. 1 is a system level deployment 200 having at least one small cell networking device and a plurality of smart sensor devices coupled to streetlight fixtures. The smart sensor devices are in many, but not all, cases implemented as smart streetlight controllers. The smart sensor devices include the inventive circular antennas, methods, and systems described in the present disclosure. The small cell networking device, traffic lights, public information signs, private entity signs, and the like may also have one or more circular antennas of the type described here.

Streetlight fixtures in FIG. 1 are coupled to or otherwise arranged as part of a system of streetlight poles, and each streetlight fixture includes a light source. Each light source, light fixture, and light fitting, individually or along with their related components, may in some cases be interchangeably referred to as a luminaire, a light source, a streetlight, a streetlamp, or some other such suitable term. In the system level deployment 200, at least one light pole includes a fixture with a small cell networking device 202, and a plurality of light poles each have a smart sensor device 204A-204H. In the present disclosure, light poles having a smart sensor device 204A-204H may individually or collectively be referred to as light poles having a smart sensor device 204 or simply light poles 204 for brevity. In these cases, and for the purposes of the present disclosure, the light sensor of each light pole 204 may be structurally and operatively identical (i.e., having same or substantially similar circuitry and embedded software, and differing by way of one or more network-level system identifiers).

As shown in the system level deployment 200, a plurality of light poles 202, 204 are arranged in one or more determined geographic areas, and each light pole 202, 204 has at least one light source positioned in a fixture. The fixture is at least twenty feet above ground level and in at least some cases, the fixtures are between about 20 feet and 40 feet above ground level. In other cases, the streetlight fixtures may of course be lower than 20 feet above the ground or higher than 40 feet above the ground. In other system level deployments according to the present disclosure, there may be 1,000 or more light poles 202, 204 arranged in one or more determined geographic areas. In these or in still other cases, the streetlight fixtures may of course be lower than 20 feet above the ground or higher than 40 feet above the ground. Although described as being above the ground, streetlight fixtures shown and contemplated in the present disclosure may also be subterranean, but positioned above the floor, such as in a tunnel.

The system of streetlight poles, streetlight fixtures, streetlight sources, or the like in the system level deployment may be controlled by a municipality or other government agency. In other cases, the system streetlight poles, streetlight fixtures, streetlight sources, or the like in the system level deployment is controlled by a private entity (e.g., private property owner, third-party service contractor, or the like). In still other cases, a plurality of entities share control of the system of streetlight poles, streetlight fixtures, streetlight sources, or the like. The shared control may be hierarchical or cooperative in some other fashion. For example, when the system is controlled by a municipality or a department of transportation, an emergency services agency (e.g., law enforcement, medical services, fire services) may be able to request or otherwise take control of the system. In still other cases, one or more sub-parts of the system of streetlight poles, streetlight fixtures, streetlight sources, or the like can be granted some control such as in a neighborhood, around a hospital or fire department, in a construction area, or in some other manner.

In the system level deployment 200 of FIG. 1, any number of streetlight poles 202, 204 and their associated fixtures may be arranged with a connector that is compliant with a roadway area lighting standard promoted by a standards body such as ANSI C136.41 (e.g., a NEMA-based connector/socket system). The connector permits the controlling or servicing authority of the system to competitively and efficiently purchase and install light sensors on each streetlight fixture. In addition, or in the alternative, the standardized connector in each streetlight fixture permits the controlling or servicing authority to replace conventional light sensors with other devices such as a small cell networking device, a smart sensor device 120 (FIG. 3), or some other device.

In the system level deployment 200, a small cell networking device is electromechanically coupled to a selected light pole 202 wherein the electromechanical coupling is performed via the connector that is compliant with the roadway area lighting standard promoted by a standards body. Stated differently, the system level deployment 200 includes at least one light pole and fixture with a small cell networking device 202, and a plurality of light poles each having a smart sensor device 204A-204H. In these light poles 204, each streetlight fixture is equipped with a standalone smart device such as the smart sensor device 120 of FIGS. 2, 3, 6, 9, and 10 that is electromechanically coupled via a respective connector that is compliant with the roadway area lighting standard promoted by the standards body. In this arrangement, each streetlight 202, 204 is equipped with a light sensor that is further electrically coupled to a processor-based light control circuit. In at least some of these embodiments, electrically coupling the light sensor to the processor-based light control circuit includes passing a signal representing an amount of light detected by the light sensor to the processor-based light control circuit. In at least some of these embodiments, the light sensor is arranged to detect an amount of lux, lumens, or other measurement of luminous flux and generate the signal representing the amount of light detected.

The processor-based light control circuit of each smart device is arranged to provide a light control signal to the respective light source based on at least one ambient light signal generated by a light sensor associated with the processor-based light control circuit. In addition, because each streetlight 202, 204 is equipped with communication capabilities, each light source in each streetlight 202, 204 can be controlled remotely as an independent light source or in combination with other light sources. In at least some of these cases, each of the plurality of light poles and fixtures with a smart sensor device 204 is communicatively coupled to the light pole and fixture with a small cell networking device 202. The communicative relationship from each of the plurality of light poles and fixtures with a smart sensor device 204 to the light pole and fixture with a small cell networking device 202 may be a direct communication or an indirect communication. That is, in some cases, one of the plurality of light poles and fixtures with a smart sensor device 204 may communicate directly to the light pole and fixture with a small cell networking device 202 or the one of the plurality of light poles and fixtures with a smart sensor device 204 may communicate via one or more other ones of the plurality of light poles and fixtures with a smart sensor device 204 or via some other means (e.g., via a cellular communication to a traditional cellular macro-cell, via a wired connection, or the like).

In the system level deployment 200 of FIG. 1, various ones of the light poles may be 50 feet apart, 100 feet apart, 250 feet apart, or some other distance. In some cases, the type and performance characteristics of each small cell networking device and each smart sensor device 120 are selected based on their respective distance to other such devices such that wireless communications are acceptable.

The light pole and fixture with a small cell networking device 202 and each light pole and fixture with a smart sensor device 204 may be directly or indirectly coupled to a street cabinet 208 or other like structure that provides utility power (e.g., "the power grid") in a wired way. The utility power may provide 120 VAC, 208 VAC, 220 VAC, 240 VAC, 260 VAC, 277 VAC, 360 VAC, 415 VAC, 480 VAC, 600 VAC, or some other power source voltage. In addition, the light pole and fixture with a small cell networking device 202, and optionally one or more of the light poles and fixtures with smart sensor devices 204A-204H, are also coupled to the same street cabinet 208 or another structure via a wired backhaul connection. It is understood that these wired connections are in some cases separate wired connections (e.g., copper wire, fiber optic cable, industrial Ethernet cable, or the like) and in some cases combined wired connections (e.g., power over Ethernet (PoE), powerline communications (PLC), or the like). For simplification of the system level deployment 200 of FIG. 1, the wired backhaul and power line 206 is illustrated as a single line. In the embodiment of FIG. 1, the street cabinet 208 is coupled to the power grid, which is administered by a licensed power utility agency, and the street cabinet 208 is coupled to the public switched telephone network (PSTN). In other embodiments, the street cabinet 208 may be electrically, communicatively, or electrically and communicatively to some other infrastructure (e.g., power source, satellite communication network, or the like) such as a windmill, generator, solar source, fuel cell, satellite dish, long- or short-wave transceiver, or the like.

In some embodiments, any number of small cell networking devices 202 and smart sensor devices 204 are arranged to provide utility grade power metering functions. The utility grade power metering functions may be performed with a circuit arranged apply any one or more of a full load, a partial load, and a load where voltage and current are out of phase (e.g., 60 degrees; 0.5 power factor). Other metering methodologies are also contemplated.

Each light pole and fixture with a smart sensor device 204 is in direct or indirect wireless communication with the light pole and fixture that has the small cell networking device 202. In addition, each light pole and fixture with a smart sensor device 204 and the light pole and fixture with the small cell networking device 202 may also be in direct or indirect wireless communication 212 with an optional remote computing device 210. The remote computing device 210, when it is included in the system level deployment 200, may be controlled by a mobile network operator (MNO), a municipality, another government agency, a third party, or some other entity. By this optional arrangement, the remote computing device 210 can be arranged to wirelessly communicate light control signals and any other information (e.g., packetized data) between itself and each respective wireless networking device coupled to any of the plurality of light poles.

A user 214 holding a mobile device 216 is represented in the system level deployment 200 of FIG. 1. A vehicle having an in-vehicle mobile device 218 is also represented. The vehicle may be an emergency service vehicle, a passenger vehicle, a commercial vehicle, a public transportation vehicle, a drone, or some other type of vehicle. The user 214 may use their mobile device 216 to establish a wireless communication session over a cellular-based network controlled by an MNO, wherein packetized wireless data is passed through the light pole and fixture with a small cell networking device 202. Concurrently, the in-vehicle mobile device 218 may also establish a wireless communication session over the same or a different cellular-based network controlled by the same or a different MNO, wherein packetized wireless data of the second session is also passed through the light pole and fixture with a small cell networking device 202.

Other devices may also communicate through light pole-based devices of the system level deployment 200. These devices may be internet of things (IoT) devices or some other types of devices. In FIG. 1, two public information signs 220A, 220B, and a private entity sign 220C are shown, but many other types of devices are contemplated. Each one of these devices may form an unlicensed wireless communication session (e.g., Wi-Fi) or a cellular-based wireless communication session with one or more wireless networks made available by the devices shown in the system level deployment 200 of FIG. 1.

The sun and moon 222 are shown in FIG. 1. Light or the absence of light based on time of day, weather, geography, or other causes provide information (e.g., ambient light) to the light sensors of the light pole mounted devices described in the present disclosure. Based on this information, the associated light sources may be suitably controlled.

Figure 2:
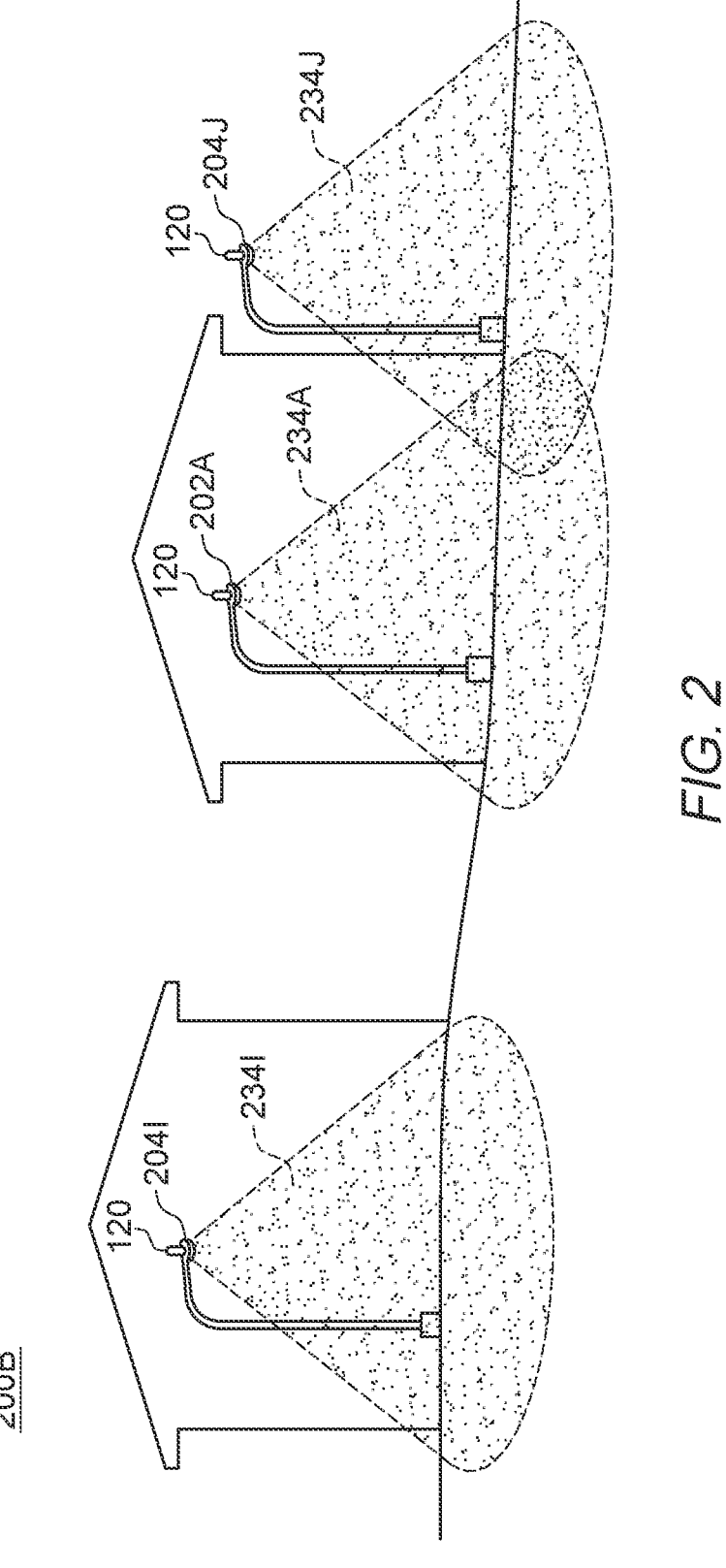
FIG. 2 is one more partial system level deployment.

FIG. 2 is one more partial system level deployment 200B. In the partial system level deployment 200B, a light pole and fixture with a small cell networking device 202 is shown and two light poles and fixtures with a smart sensor device 204I, 204J are shown. The individual small cell networking device 202 and smart sensor devices 120 are also identified. In some cases, a light sensor detects both ambient light from above its respective fixture and other light from different directions. For example, where light from two light sources overlap, one or both of the small cell networking device 202 and the smart sensor devices 120 may adjust their light output. The adjustment may be a reduction in light output, a directional change to light output, or some other adjustment. Along these lines, where light from two light sources do not overlap at all, there may be areas in need of additional illumination. In this case, one or both of the small cell networking device 202 and the smart sensor devices 120 may adjust their light output. In some cases, the small cell networking device 202 and the smart sensor devices 120 are arranged to dynamically detect motion (e.g., infrared detection sensor, mobile device transceiver detection, or the like) and adjust light output to increase, decrease, or change other parameters such as a direction of light output when the motion is directionally detected.

Figure 3:
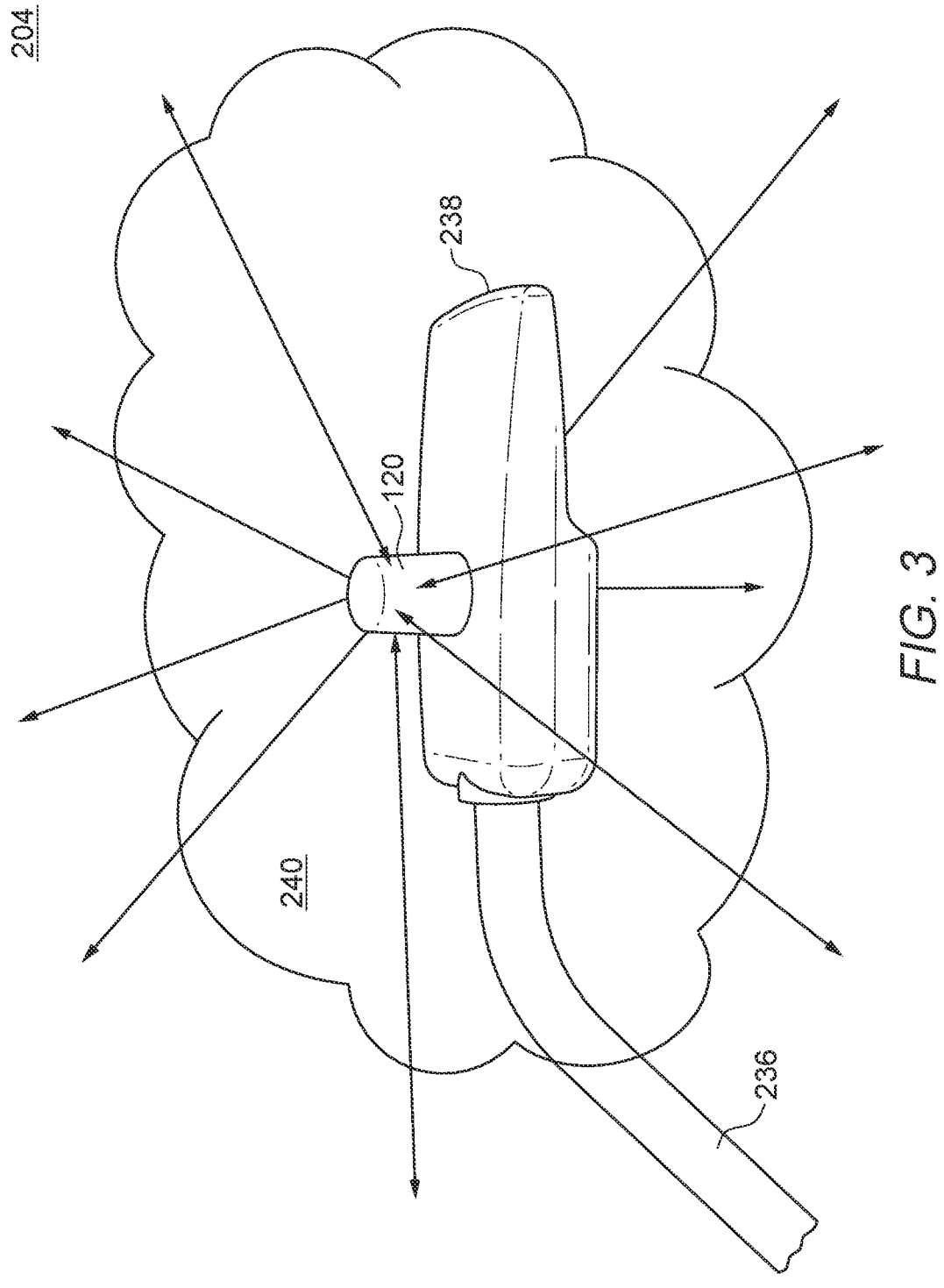
FIG. 3 is portion of a light pole and fixture with a smart sensor device.

FIG. 3 is portion of a light pole and fixture with a smart sensor device 204. A streetlight support structure 236 (e.g., a pole) supports a luminaire 238. The luminaire has a connector (e.g., a socket) that is compliant with a roadway area lighting standard promoted by a standards body such as ANSI C136.41 (e.g., a NEMA-based connector/socket system). A smart sensor device 120 includes a corresponding connector (e.g., a set of "pins"), which permits electro-mechanical coupling of the smart sensor device 120 to the luminaire 236.

The smart sensor device 120 in FIG. 3 is often, but not exclusively, arranged for omnidirectional communications. Accordingly, a representation of such omnidirectional communications is represented as an enveloping radio frequency (RF) cloud 240. It is recognized that omnidirectional communications include communications that are substantially omnidirectional, but not completely omnidirectional. For example, omnidirectional communications include implementations where at least some RF signal is attenuated or completely blocked by a structure (e.g., building, sign, tower, pole, support, luminaire 238, or the like), foliage (e.g., trees, bushes, vines, or the like), or some other manmade or naturally occurring obstruction. In this respect, the wireless communication device, in at least some cases, does not beam-form or otherwise aim the RF signal, but instead, the RF signal is propagated or received, as the case may be, in the unobstructed region about the antenna of the smart sensor device 120.

Figure 4:
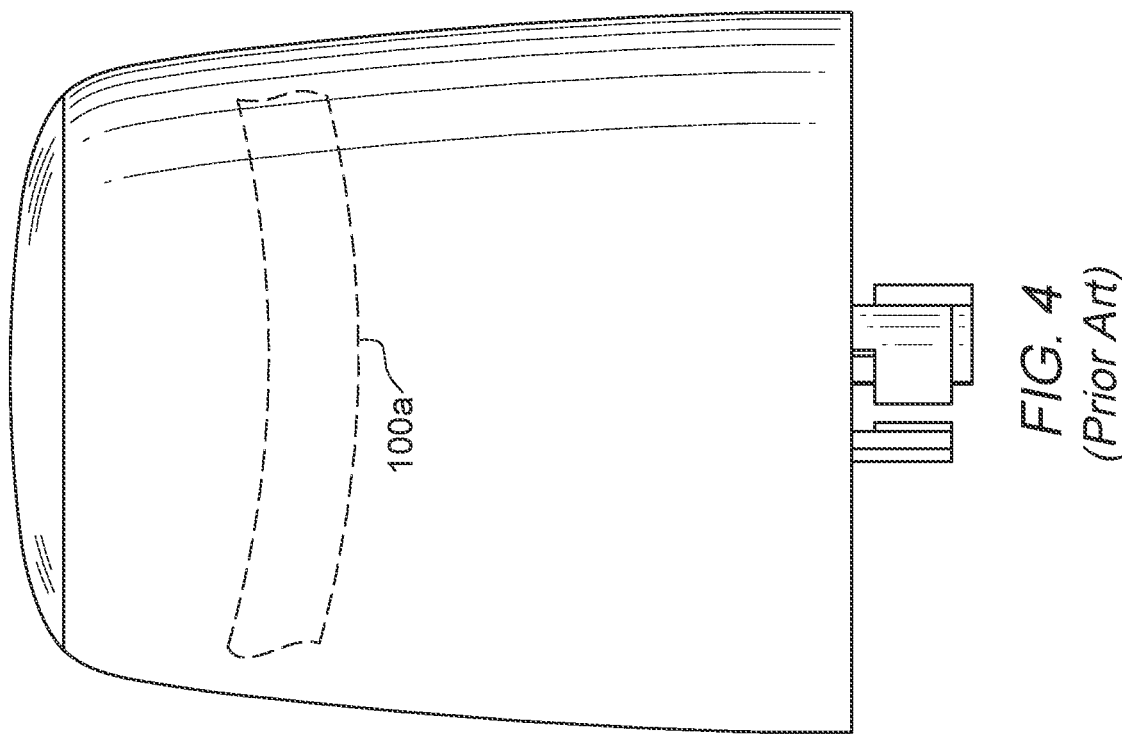
FIG. 4 is a conventional smart sensor device embodiment.

FIG. 4 is a conventional smart sensor device 120a embodiment. The conventional smart sensor device 120a includes a conventional antenna structure 100a mounted inside the generally cylindrical housing of the conventional smart sensor device 120a. The dashed lines of the conventional antenna structure 100a represent the hidden nature of the conventional antenna structure 100a. More particularly, the conventional antenna structure 100a is inside the housing of the conventional smart sensor device 120a.

In at least one case, the conventional antenna structure 100a is formed as a flexible tape having at least one adhesive surface. During manufacture of the conventional smart sensor device 120a, the conventional antenna structure 100a is adhered to the inside surface of the conventional smart sensor device 120 housing, and wires (not shown) of the conventional antenna structure 100a are electrically coupled to a circuit board that is also inside the housing.

Figure 5:
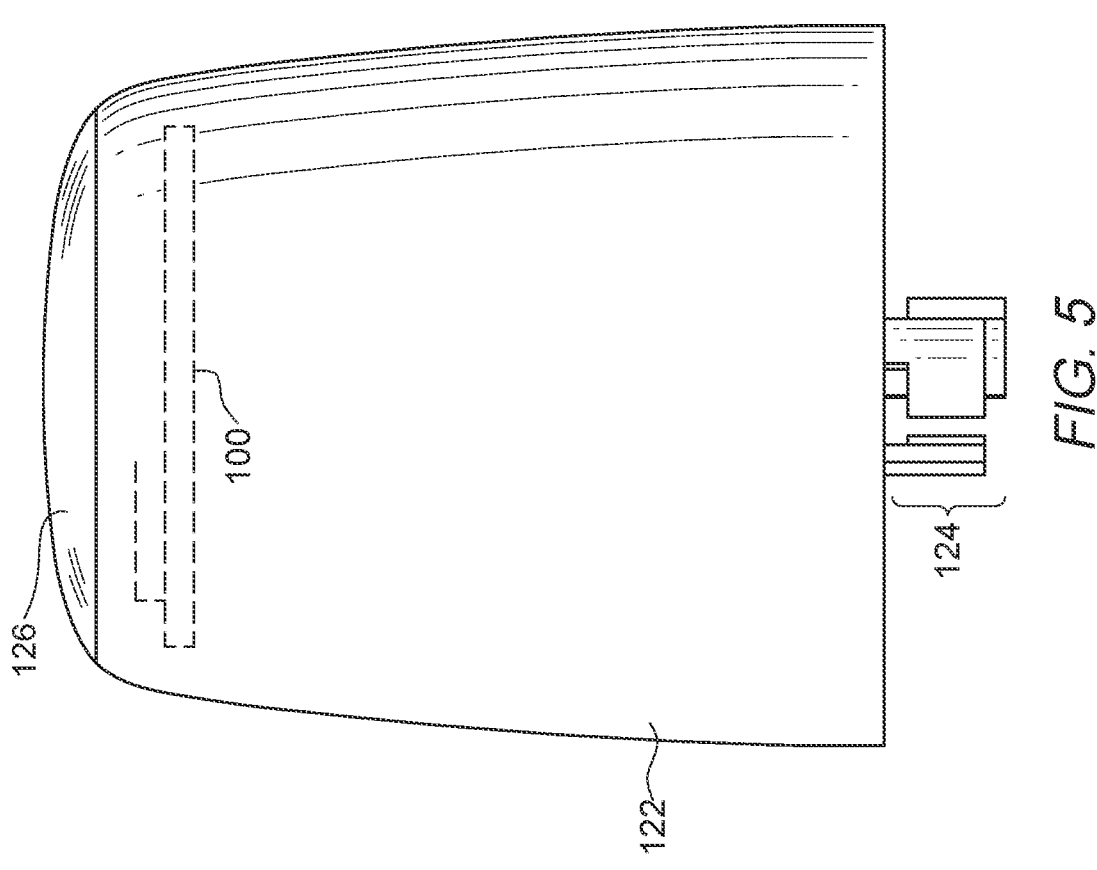
FIG. 5 is a smart sensor device embodiment.

FIG. 5 is a smart sensor device 120 embodiment. The smart sensor device 120 includes a housing 122, which may be generally cylindrical. The generally cylindrical housing 122 may be formed of a plastic, a glass, a metal, a composite material, or any other suitable material. The generally cylindrical housing 122 may in some cases have heat dissipation properties to assist in the removal of heat generated by electronic circuitry inside the housing. In at least some cases, the generally cylindrical housing 122 is arranged to resist the nesting birds or other animals. In at least some cases, the generally cylindrical housing 122 is arranged to resist accumulation of dirt, snow, or any foreign bodies or materials. In at least some cases, the generally cylindrical housing 122 is symmetrically arranged to have a generally same visual appearance when viewed from any perspective.

The generally cylindrical housing 122 includes a connector 124 (e.g., a set of "pins") that is compliant with a roadway area lighting standard promoted by a standards body such as ANSI C136.41 (e.g., a NEMA-based connector/socket system). When the smart sensor device 120 is deployed, the pins of the connector 124 mate with a corresponding receptacle (e.g., a socket) that is integrated in a streetlight, a luminaire, a control box, or some other structure, which permits electro-mechanical coupling of the smart sensor device 120 to the streetlight, luminaire, control box, or the like.

The generally cylindrical housing 122 of the smart sensor device 120 includes a light-transmissive surface 126. The light transmissive surface may be transparent or partially transparent (e.g., partially opaque). In some embodiments, the light-transmissive surface 126 is integrated with the generally cylindrical housing 122, and in other cases, the light-transmissive surface 126 is a distinct structure that is removably or fixedly coupled to the generally cylindrical housing 122. In the embodiment of FIG. 5, the light-transmissive surface 126 is arranged at a "top" of the smart sensor device 120, but in at least some embodiments, the light-transmissive surface 126 is formed additionally or alternatively in or through a surface wall of the generally cylindrical housing 122. Generally, the light-transmissive surface 126 permits ambient light to reach an electronic light sensor (e.g., a photosensor, which is not shown in FIG. 5) formed within a volumetric cavity inside the generally cylindrical housing 122. As described in the present disclosure, the light sensor is arranged, in at least some cases, to provide a first output signal that directs a light source to illuminate when light reaching the light sensor crosses a determined first threshold, and to provide a second signal (e.g., an alteration of the first signal or a different signal) when the light reaching the light sensor crosses a determined second threshold. In some cases, the first and second thresholds are the same thresholds, and in some cases, the first and second thresholds are different thresholds.

The smart sensor device 120 includes a circular antenna structure 100 mounted inside the generally cylindrical housing 122 of the smart sensor device 120. The dashed lines of the circular antenna structure 100 represent the hidden nature of the circular antenna structure 100. More particularly, the circular antenna structure 100 is inside the housing of the smart sensor device 120.

Figure 6:
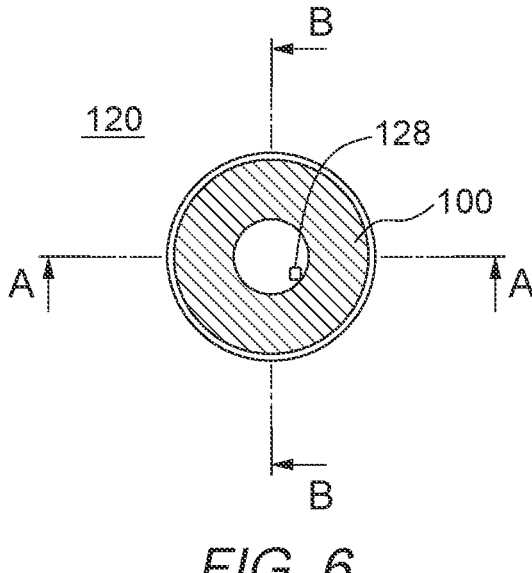
FIG. 6 is a top-down view of a smart sensor device.

FIG. 6 is a top-down view of a smart sensor device 120. The smart sensor device 120 in FIG. 6 does not have a light-transmissive surface 126, and accordingly, a circular antenna structure 100 embodiment is visible. A light sensor 128 is also identified. The embodiment of FIG. 6 also includes two sets of cross-sectional indicators. A first set of cross-sectional indicators A-A indicates a first planar cross-section of the smart sensor device 120, and a second set of cross-sectional indicators B-B indicates a second planar cross-section of the smart sensor device 120.

Figure 6A:
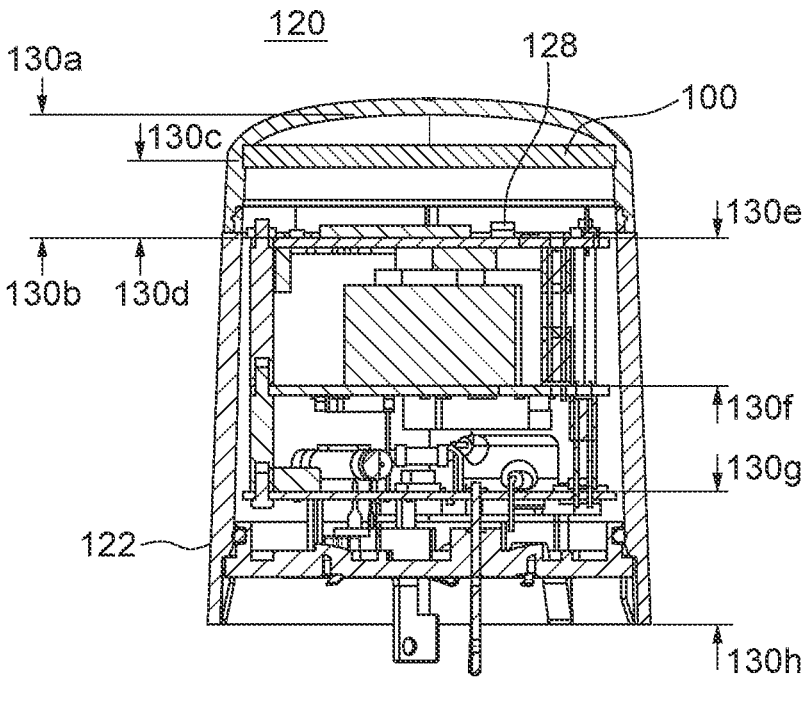
FIG. 6A is the planar cross-section of the smart sensor device of FIG. 6 at A-A.
Figure 6B:
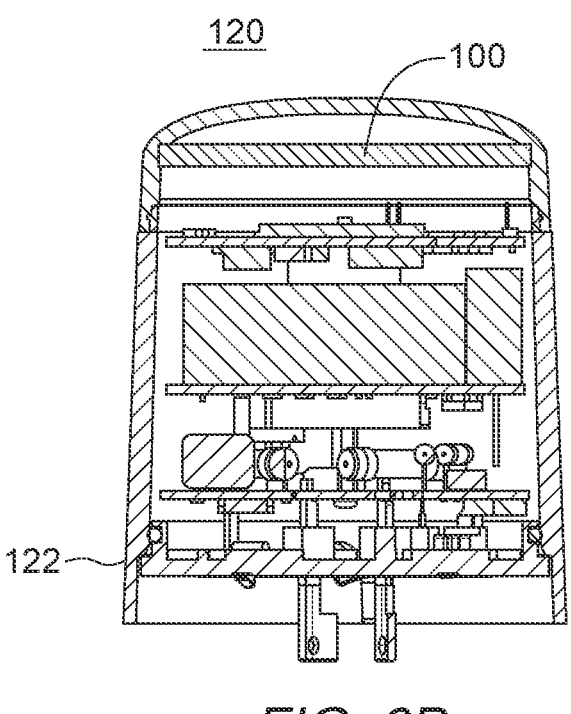
FIG. 6B is the planar cross-section of the smart sensor device of FIG. 6 at B-B.

FIG. 6A is the planar cross-section of the smart sensor device 120 of FIG. 6 at A-A. FIG. 6B is the planar cross-section of the smart sensor device 120 of FIG. 6 at B-B. In the present disclosure, FIGS. 6, 6A, and 6B may be individually or collectively referred to as FIG. 6. Structures earlier identified are not necessarily repeated for brevity.

A circular antenna may be formed as a disc having a suitable diameter sized in accordance with an upper diameter of the generally cylindrical housing. In at least some cases, the smart sensor device 120 of FIG. 6 forms a circular antenna 100 on a substrate that has a "donut" shape. The aperture in the center of the donut permits light from outside of the smart sensor device 120 to pass through the circular antenna 100 structure and reach the light sensor 128. Understandably, a circular antenna formed as a solid disc would obstruct such light.

The smart sensor device 120 of FIG. 6B includes a plurality of distance measurement icons 130a, 130b, 130c, 130d, 130e, 130f, 130g, and 130h.

In some embodiments, a distance measured between a point at icon 130a and a point at icon 130b is between about 15 millimeters (15 mm) and about 30 mm. In one embodiment, the distance is about 23 mm. Other distances, which may be less than 15 mm and greater than 30 mm are of course contemplated.

In some embodiments, a distance measured between a point at icon 130c and a point at icon 130d is between about five millimeters (5 mm) and about 25 mm. In one embodiment, the distance is about 15 mm. Other distances, which may be less than 5 mm and greater than 25 mm are of course contemplated.

In some embodiments, a distance measured between a point at icon 130e and a point at icon 130f is between about 15 mm and about 40 mm. In one embodiment, the distance is about 28 mm. Other distances, which may be less than 15 mm and greater than mm are of course contemplated.

In some embodiments, a distance measured between a point at icon 130g and a point at icon 130h is between about 5 mm and about 35 mm. In one embodiment, the distance is about 20 mm. Other distances, which may be less than 5 mm and greater than mm are of course contemplated.

The smart sensor device 120 may be formed by layering a plurality of circuit structures (e.g., circuit boards) in a stack. Such formation is desirable, in at least some cases, because it permits separation of high voltage components from low voltage components. Such formation may additionally or alternatively be desirable, in at least some cases, because it permits separation of components that produce a high-level of electronic noise from other components that cannot effectively tolerate a high-level of electronic noise. Accordingly, the distances between various "layers" of the circuitry and structures at the represented icons in FIG. 6A are desirably selected.

As evident in FIG. 6, the circular antenna 100 is arranged in a substantially horizontal plane relative to the earth or "ground" when the smart sensor device 120 is deployed. Such an orientation favorably permits robust, omnidirectional RF communications (e.g., FIG. 3). Furthermore, in this orientation, the inventor has recognized robust RF communications may be facilitated by keeping the circular antenna 100 from a ground plane in the smart sensor device 120 by at least about 15 mm.

Figure 7A:
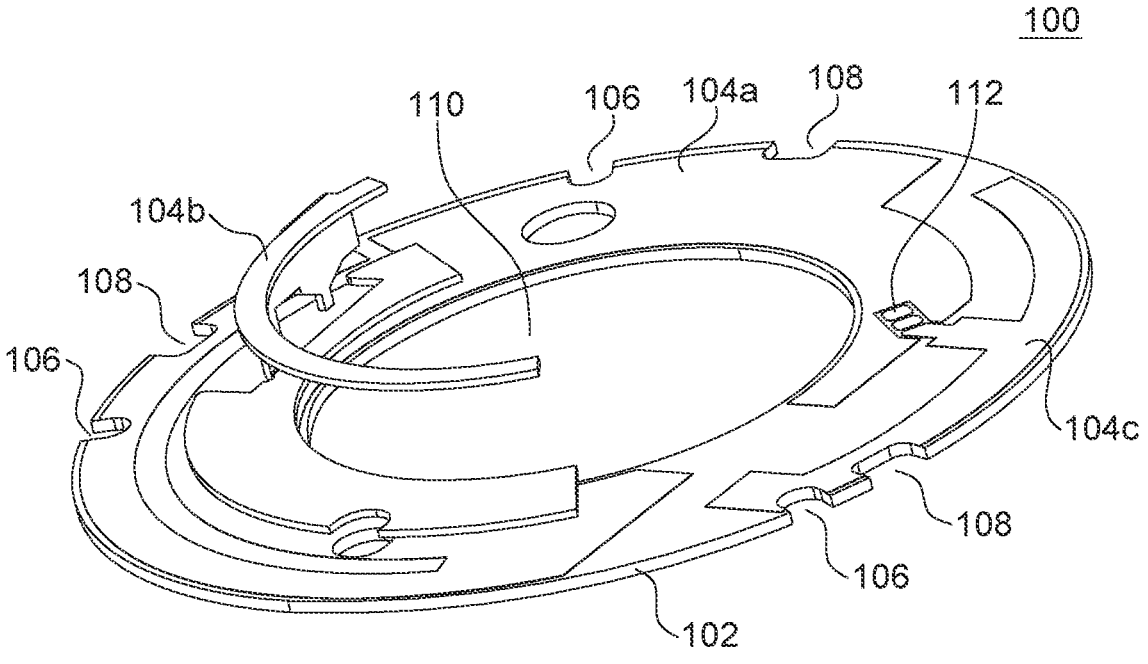
Figure 7B:
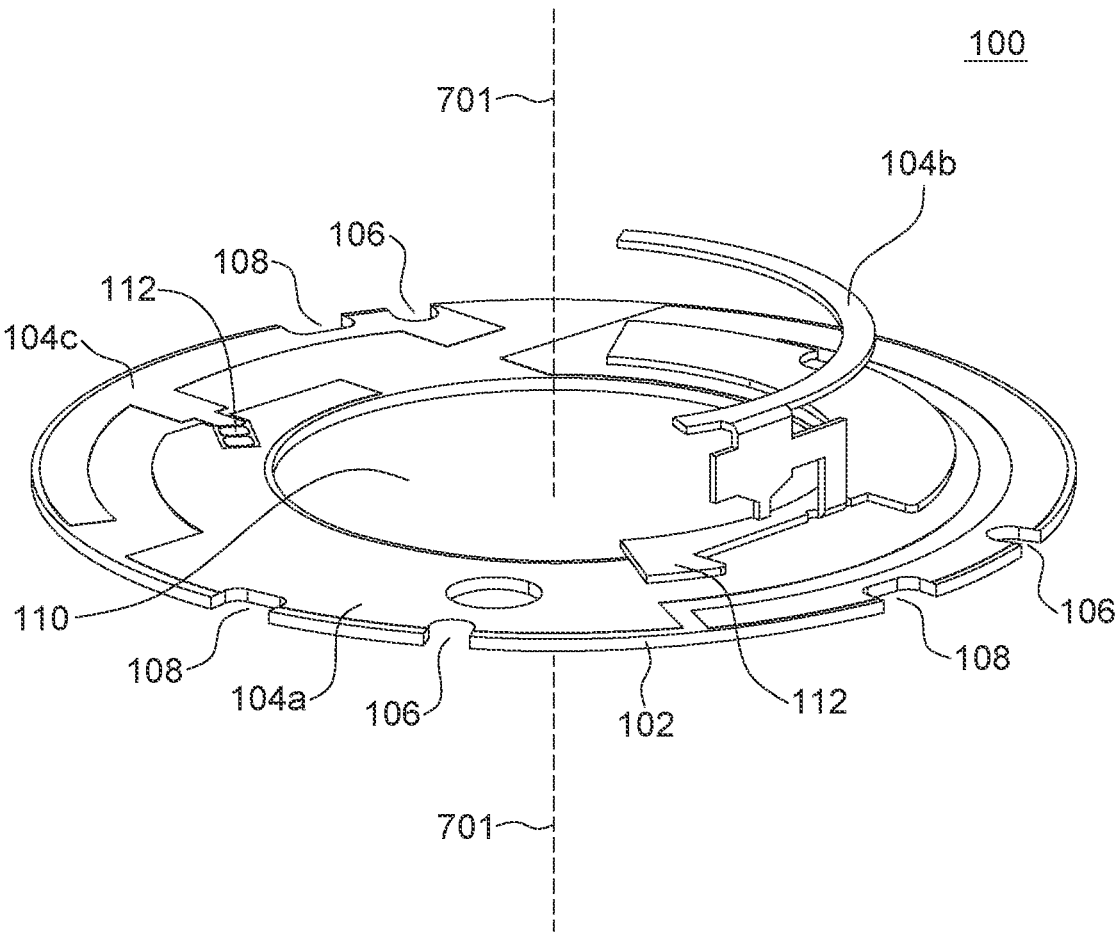
Figure 7C:
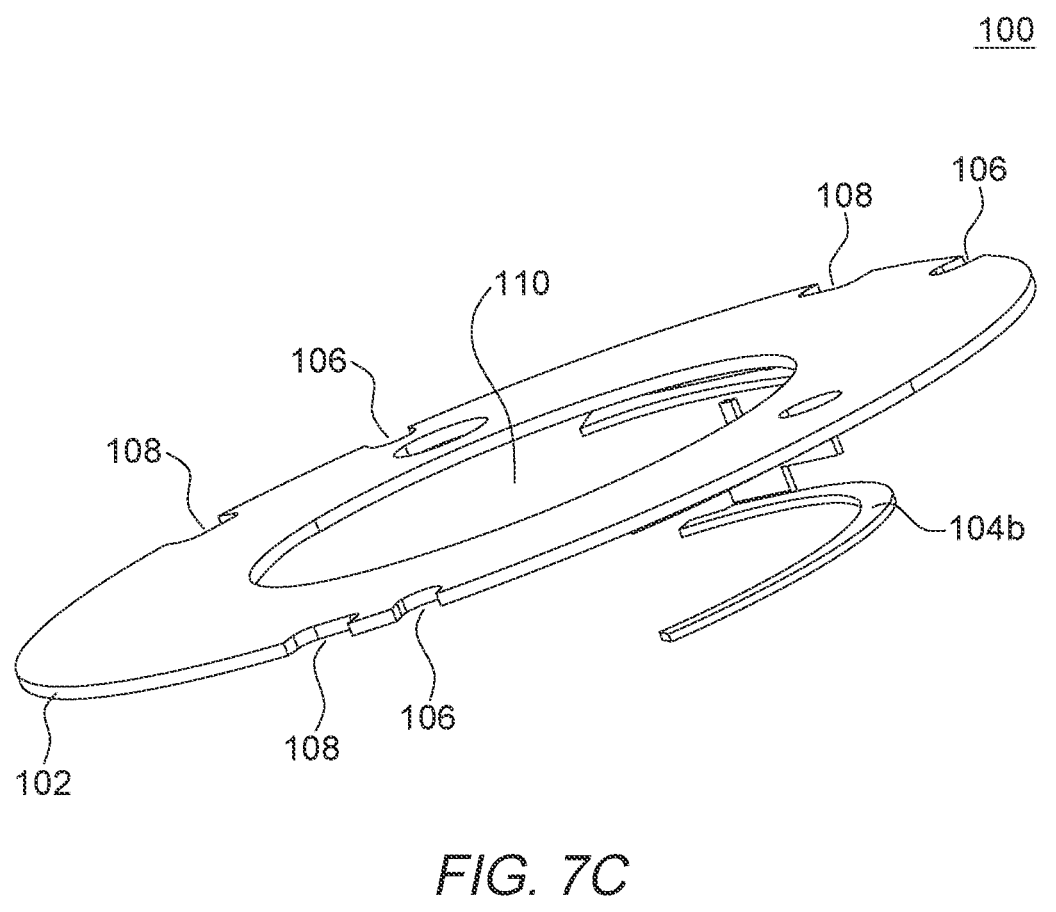
Figure 8A:
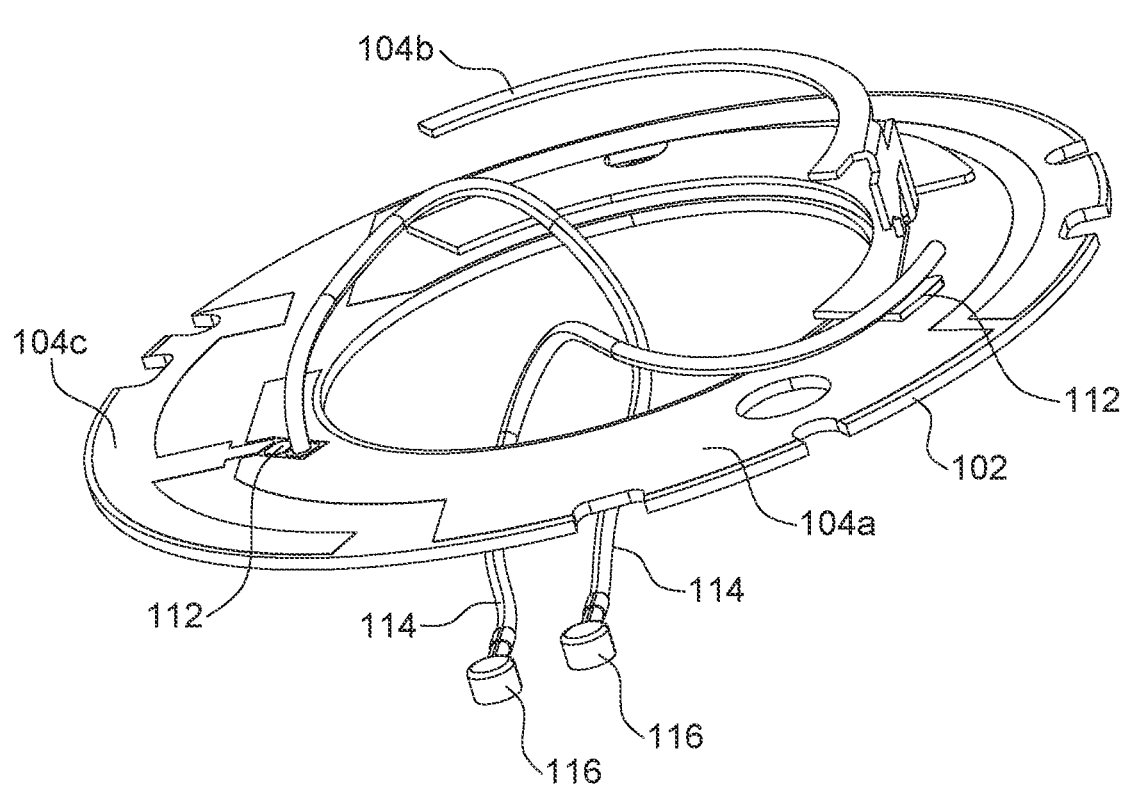
FIGS. 8A-8D are the embodiment of a circular antenna of FIG. 7 from different perspectives.
Figure 8B:
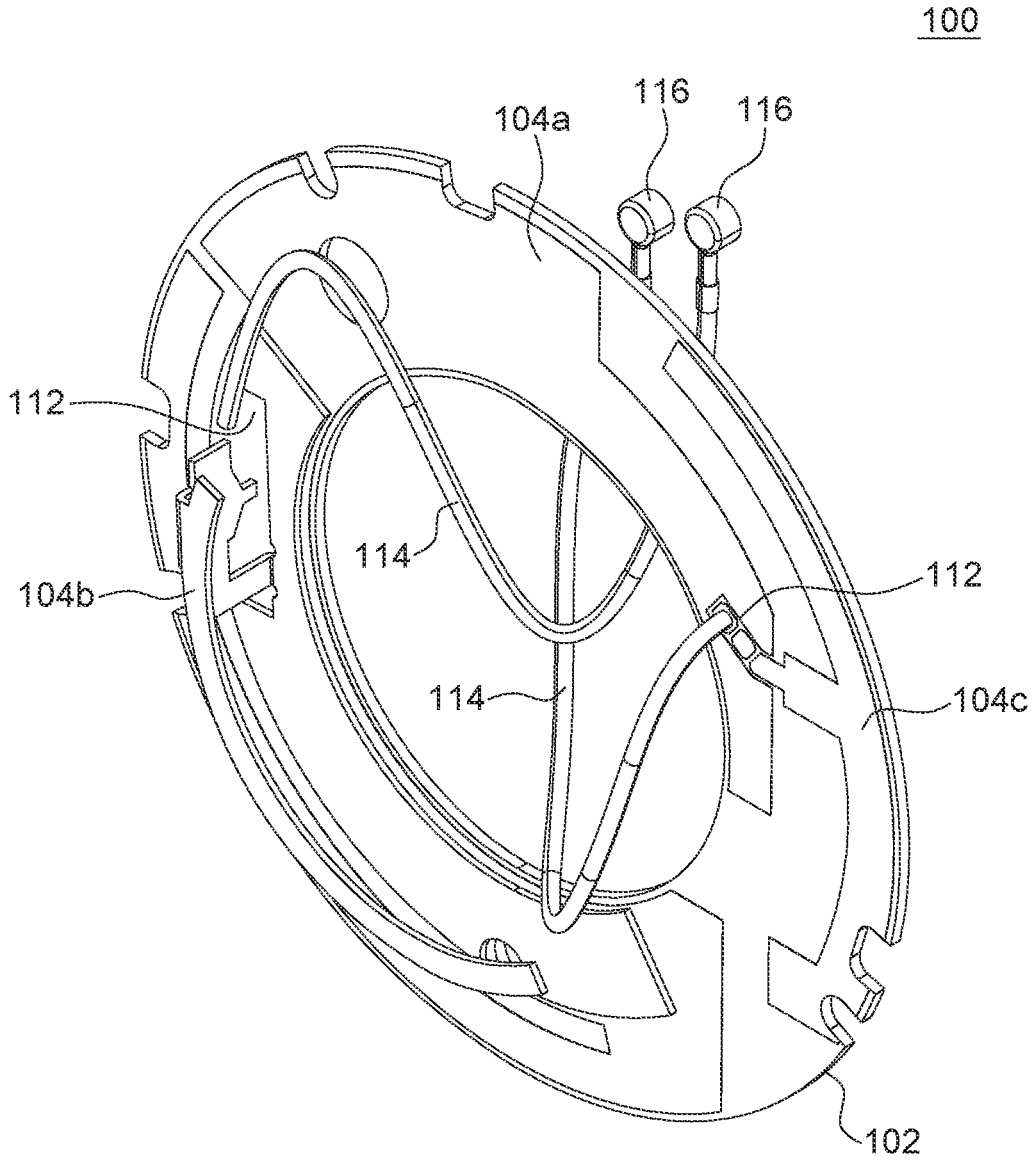
Figure 8C:
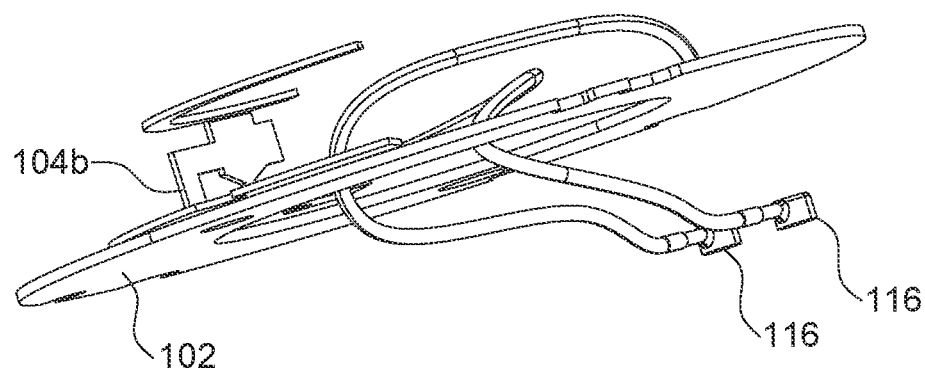
Figure 8D:
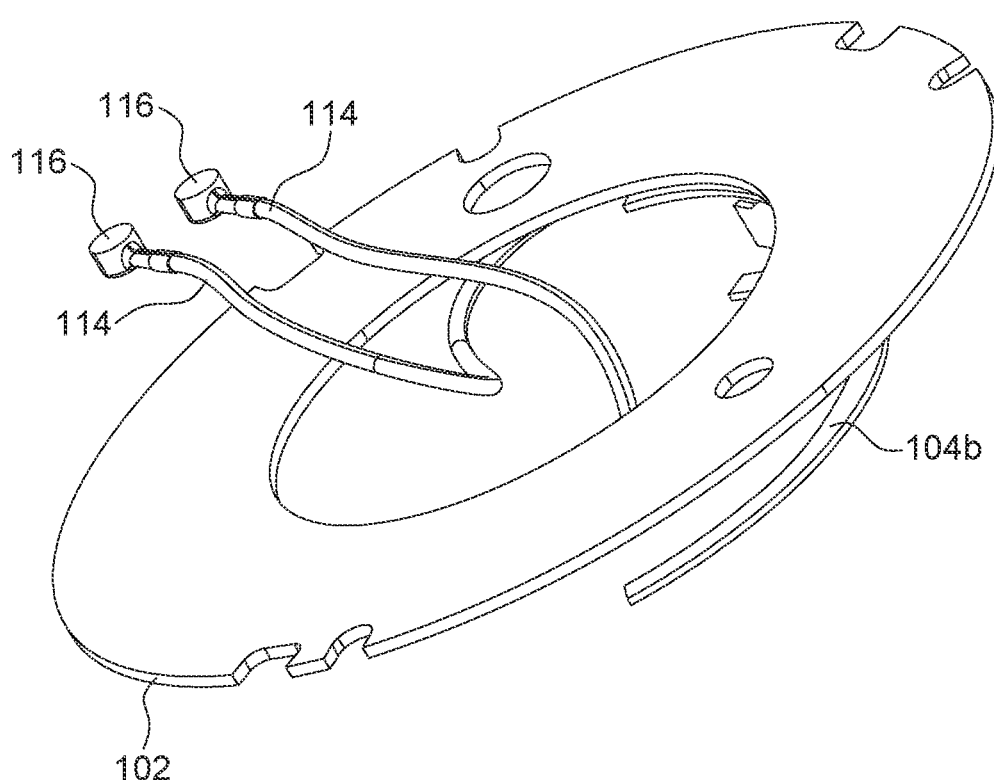

FIGS. 7A-7C illustrate an embodiment of a circular antenna 100 from different perspectives. In the present disclosure, FIGS. 7A-7C may be individually or collectively referred to as FIG. 7. Structures earlier identified are not necessarily repeated for brevity.

The circular antenna 100 includes a substrate 102. One or more radiative antenna elements are positioned upon or otherwise integrated with the substrate 102. In the circular antenna 100 embodiment of FIG. 7, three radiative elements are presented including a first radiative antenna element 104a, a second radiative antenna element 104b, and a third radiative antenna element 104c. In the present disclosure, to avoid unnecessarily muddling the descriptive text, radiative antenna elements 104a, 104b, 104c may be individually or collectively referred to as radiative element 104 or radiative elements 104.

The substrate 102 may be formed from any suitable material and have any suitable dimensions. As disclosed herein, the substrate 102 of the circular antenna 100 has a generally circular shape. Various portions of the perimeter of the substrate 102 may have any number of cut-outs, notches, protuberances, flattened areas, mounting structures 106, alignment structures 108, or other such irregularities that depart the generally circular shape from a perfect circle. Accordingly, a generally circular shape includes a generally hexagonal shape, a generally octagonal shape, or the like. A generally circular shape may be a regular, symmetrical shape or an irregular, non-symmetrical shape. The substrate 102 may further include one or more interruptions (e.g., one or more apertures 110), one or more electrical connection points 112, and additional features not shown in FIG. 7.

In some cases, the generally circular shape of the substrate 102 has a radius between about three-fourths of an inch (0.75 in.) and about four inches (4 in.). In at least one case, the radius of the substrate 102 is about one and one-half inches (1.5 in.).

The generally circular shape of the substrate 102 may be solid or interrupted. A solid substrate may have the appearance of a disc. An interrupted substrate may have the appearance of a donut. Additionally, or alternatively, an interrupted form of the substrate 102 may have one or more apertures, which are circular, ovular, elongated, square, triangular, or have any other suitable shape and location of interruption. An interrupted substrate may provide beneficial reductions of weight, beneficial improvement in heat dissipation, an opening to permit light from "above" the circular antenna 100 to reach a light sensor "below" the substrate 102, and for other reasons.

In cases where the substrate 102 is donut-shaped, the substrate's donut-hole interruption may have a radius between about one-eighth of an inch (0.125 in.) and about three and one-half inches (3.5 in.). In at least one case, the donut-hole interruption in the substrate 102 has a radius of about one-half inches (0.5 in.)

The substrate 102 may in some cases be formed from a fiberglass material, a composite material, a plastic, an epoxy such as an epoxy glass-reinforced resin or a polyphenylene oxide (PPO) resin, a suitable combination of these, or some other material or materials. In some cases, the substrate may be a polytetrafluoroethylene (PTFE), which may also be referred to as TEFLON. The substrate 102 may be formed as a solid mass, or alternatively, the substrate 102 may be formed as a laminate. In some cases, the substrate 102 is formed from a light transmissive material, and in at least some of these cases, the material permits light to pass through the substrate 102 and reach an electronic light sensor.

In many desirable cases, the substrate 102 will be RF inert. That is, the substrate 102 will have a small, stable dielectric constant (DK), small amounts of dielectric loss (DF), an acceptable level of RF dissipation and loss, and overall low water absorption properties. A small, stable DK is desirable because materials with a high probability for the change of dielectric constant often have corresponding fluctuations in impedance. As it is known, changes to impedance can cause disruptions to harmonics that make up the digital signal being communicated (i.e., transmitted, received, or transmitted and received) through the antenna, and this disruption cause an overall loss of digital signal integrity.

With respect to other aspects of RF signal quality and robust RF communications related to the substrate 102 materials, dielectric loss (DF) is a measure of the quality of signal communication. A smaller amount of dielectric loss generally indicates a small amount of signal wastage and a reduced amount of generated heat. Another factor in the selection of material used to form the substrate 102 is a matching of thermal expansion. If the thermal expansion rates of the materials used to form the substrate 102, the radiative antenna elements 104, and any other materials in the circular antenna 100 are not properly selected, then the materials could separate from each other due to changes in temperature thereby causing the circular antenna 100 to perform poorly or even to fail entirely. Yet one more factor associated with a selection of materials for substrate 102 is a measure of water absorption. It is known that high amounts of water intake will affect the dielectric constant and dielectric loss of substrate 102, which affect the quality of the circular antenna 100. Notwithstanding these factors that are analyzed to select an appropriate material for substrate 102, the materials used to form substrate 102 may also be selected for resistance to extreme temperature, resistance to impact, resistance to degradation over time, resistance to vibration, resistance to hazardous chemicals, and the like.

The substrate 102 is preferably formed with a desired level of flexibility. In some embodiments, the substrate 102 is substantially rigid. That is, the substrate 102 resists visible deformation at least under its own weight. In some cases, the substrate 102 may be arranged to resist visible deformation under one eighth pound per square foot (0.125 ft-lbs) of torque, one quarter pound per square foot (0.25 ft-lbs) of torque, one-half foot pounds (0.5 ft-lbs) of torque, one foot pound (1 ft-lbs) of torque, two foot pounds (2 ft-lbs) of torque, or some other selected amount of torque.

The formation of a substrate 102 that is substantially rigid may in some cases be achieved by forming the substrate 102 to a desired thickness. In some cases, a substrate has a thickness of between about two-hundredths of an inch (0.02 in or 20 mils) and about one-quarter inch (0.25 in. or 250 mils). The substrate 102 may, of course, be thinner or thicker. In at least some cases, the substrate 102 is formed to a thickness of about seven-hundredths of an inch (0.07 in or 70 mils).

A radiative antenna structure is an electrical device that converts an electric signal into radio waves and vice versa. More specifically, in a radio frequency (RF) communications system, the radiative antenna structure converts guided radio wave energy, such as a signal traveling in a signal conduction medium (e.g., coaxial cable, twisted pair, or the like), to energy that is transmitted, emitted, or otherwise radiated out into free space. Such an antenna may also receive and capture RF energy from free space and induce a guided radio wave energy in a signal conduction medium.

The radiative antenna structure is electrically coupled to a radio transmitter, a radio receiver, or a combined radio transmitter-receiver (i.e., a transceiver). In transmission, a radio transmitter supplies an oscillating radio frequency electric current to the antenna's terminals, and the antenna radiates the energy from the current as electromagnetic (radio) waves. In reception, an antenna intercepts some of the power of an electromagnetic wave in order to produce a tiny voltage at its terminals that is applied to a receiver to be amplified.

As it is known, radiative antenna structures are sized, shaped, located, and formed of materials based on one or more types of signals that the radiative antenna structure will transmit, receive, or transmit and receive. As it is also known, the design of any particular radiative antenna structure involves trading off particular parameters to achieve a desirable result. For example, the tradeoffs may include: 1) reducing a size in one or more dimensions while increasing power of signals transmitted through the radiative antenna structure, 2) separating two or more radiative antenna structures from each other to avoid losses (e.g., signals desirably received with one radiative antenna structure are instead absorbed by another nearby radiative antenna structure, energy transmitted by one radiative antenna structure are undesirably absorbed by a nearby radiative antenna structure rather than continuing into free space, and the like), and 3) accepting a reduced efficiency in a radiative antenna structure so as to shape the radiative antenna structure to fit an available location in the electronic device where the structure is integrated. Many other tradeoffs are of course contemplated by the inventor.

Many devices where circular antenna 100 embodiments of the type discussed in the present disclosure will operate require two or more radiative antenna structures. For example, devices such as smart lighting controllers may typically include: 1) primary cellular radiative antenna structures (e.g., Global System for Mobile Communications (GSM) frequencies, Universal Mobile Telecommunications System (UMTS) frequencies, Long Term Evolution (LTE), frequencies, 5G frequencies, millimeter wave (mmWave) frequencies, and the like); 2) diversity cellular radiative antenna structures; global positioning system (GPS) radiative antenna structures (e.g., GPS of the United States, Global Navigation Satellite System (GLONASS) of Russia, BeiDou Navigation Satellite System (BDS) of China, and the like); local area network (LAN) radiative antenna structures such those compliant with a WIFI communications standard; personal area network (PAN) radiative antenna structures such as those compliant with a BLUETOOTH communications standard; counterpoise structures, and the like.

Radiative antenna structures of the type integrated in circular antenna 100 embodiments may be formed of foil, sheet metal, or electrically conductive material of some other form. In at least some cases, the radiative antenna structure is formed with a laser direct structuring (LDS) process. The electrically conductive material of the radiative antenna structures may be any one or more of aluminum, copper, stainless steel, silver, gold, or some other material. The material selected to form a radiative antenna structure, and the form of the material, may be based on any one or more of weight, conductivity, heat transfer, electromagnetic properties, cost, manufacturability, and many other properties.

FIGS. 8A-8D are the embodiment of a circular antenna 100 of FIG. 7 from different perspectives. In the present disclosure, FIGS. 8A-8D may be individually or collectively referred to as FIG. 8. Structures earlier identified are not necessarily repeated for brevity.

In the embodiment of FIG. 8, the circular antenna structure 100 includes a substantially rigid substrate 102 that has a substantially certain radius between about three-fourths of an inch (0.75 in.) and about four inches (4 in.) and a substantially certain thickness between about one-hundredth of an inch (0.01 in. or 10 mils) and about one-half inch (0.50 in. or 500 mils). In at least one case, the substrate 102 has a radius of about one and one-half inch (1.5 in) and a thickness of about of about seven-hundredths of an inch (0.07 in. or 70 mils).

The circular antenna structure 100 has a first radiative antenna element 104a integrated with the substrate 102. The first antenna element 104a may be, for example, a copper, silver, or gold foil structure arranged on the surface of the substrate 102. The first antenna element 104a may be adhered to the substrate 102 via an encapsulation layer of epoxy or some other material. In other embodiments, the first antenna element 104a may be embedded within, deposited on, adhered to, or otherwise integrated with the substrate 102.

In at least some cases, the first antenna element 104a is a primary cellular antenna arranged to transmit RF data that is communicated to the antenna via a first signal conduction medium 114. The primary cellular antenna may be arranged to pass signals at frequencies between 600 megahertz (600 MHz) and three gigahertz (3 GHz). In at least some cases, the primary cellular antenna is arranged to communicate signals at frequencies between 703 MHz and 2690 MHz. In other cases, the first antenna element 104a is a ground plane.

The first signal conduction medium 114 may be formed as a coaxial cable (FIG. 8), a twisted pair, or some other electrical conduit suitable for carrying signal data to, from, or to and from the first radiative antenna element 104a. A first end of the first signal conduction medium 114 may be joined in any suitable way to the first antenna element 104a. For example, in some cases, the first end of the first signal conduction medium 114 is soldered at an electrical connection point 112, which may be, for example, a solder pad. In other cases, the first signal conduction medium 114 is electrically adjoined to the first antenna element 104a via a miniature or ultra-miniature RF connector such as a U.FL series connector from HIROSE (UFL connector), a surface mount technology (SMT) connector, an ultraminiature coaxial connector (UMCC) assembly, or some other form of high-frequency electrical connector. In the circular antenna 100 embodiment of FIG. 8, a second end of the first signal conduction medium 114 is arranged with a suitable RF signal connector 116 such as a UFL connector, but other embodiments and mechanisms to electrically couple the second end of the first signal conduction medium 114 to an appropriate electronic circuit are contemplated.

In some cases, the circular antenna structure 100 has a second radiative antenna element 104b integrated with the substrate 102. In at least some cases, the second antenna element 104b is an antenna structure arranged to receive location-based signals from one or more satellites of a satellite constellation system that provides geographic location information. The satellite constellation system may be a United States GPS system, a Russian GLONASS system, a Chinese BDS system, or some other such system. In the embodiment of FIG. 8, the second antenna element 104b is arranged as a sheet metal structure adhered to the substantially rigid substrate 102.

RF signals bearing satellite-based location information are collected by the second antenna element 104b and passed via a second signal conduction medium 114 to a particular transceiver circuit (not shown). In at least some cases, the second signal conduction medium 114 is formed along the lines of the first signal conduction medium 114. In at least some cases, the second signal conduction medium 114 is electrically, and therefore communicatively, coupled to the second antenna element 104b in a similar manner as the first signal conduction medium 114 is communicatively coupled to the first radiative antenna element 104a. In other cases, the second signal conduction medium 114 has similar suitable RF signal connectors 116 as the first signal conduction medium 114. Conversely, if the first antenna element 104a is arranged as a ground plane, the first antenna element 104a may also operate as a ground plane for the second antenna element 104b, and in at least some of these cases, a ground shield in both the first signal conduction medium 114 and the second signal conduction medium 114 is electrically coupled to the first antenna element 104a.

In still other embodiments, the circular antenna structure 100 has a third radiative antenna element 104c integrated with the substrate 102. In at least some cases, the third antenna element 104c is a cellular diversity antenna element arranged to receive cellular frequency signals present in the air in proximity to the circular antenna structure 100. The third antenna element 104c may be formed of materials and may have properties that are along the lines of the first antenna element 104a. The third antenna element 104c may be communicatively coupled to a suitable electronic receiver circuit via any suitable signal conduction medium 114 and any suitable connection points 112, RF signal connectors 116, or the like. Alternatively, if the first antenna element 104a is arranged as a ground plane, then the third radiative antenna element 104c may be arranged as the primary cellular antenna arranged to transmit RF data as described herein.

Figure 9A:
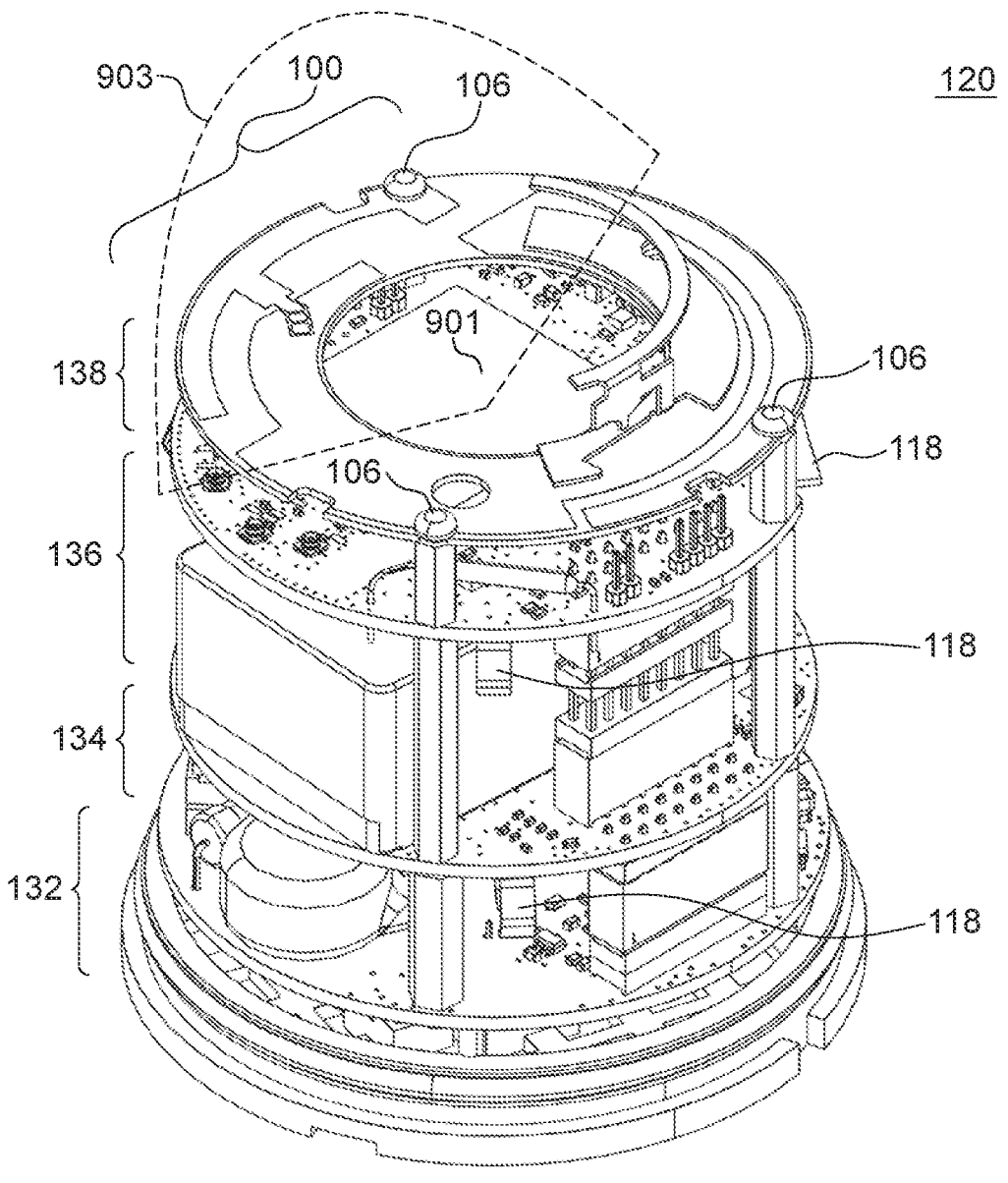
FIG. 9A is a smart sensor device embodiment that deploys a circular antenna structure from a first perspective.
Figure 9B:
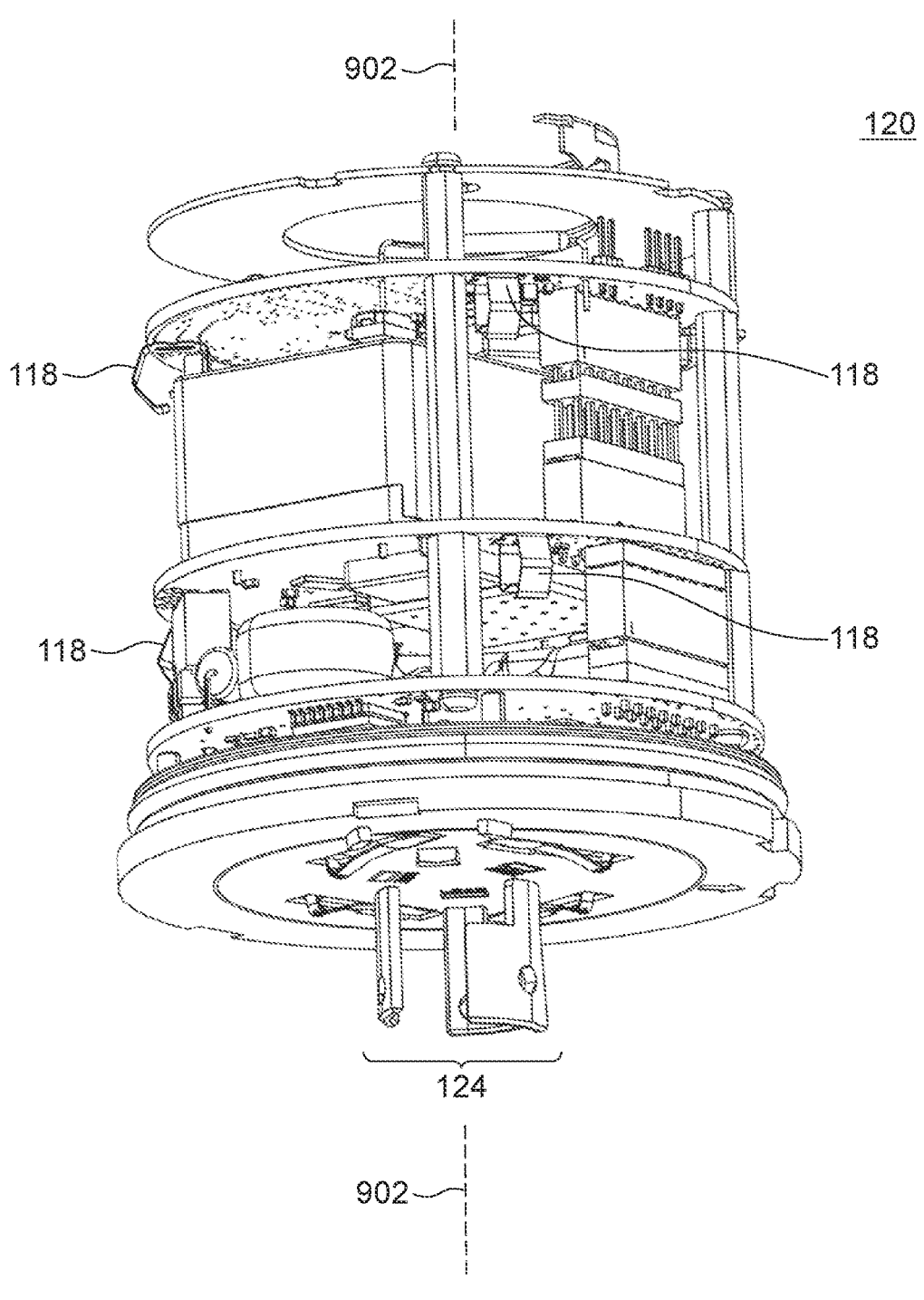
FIG. 9B is the smart sensor device embodiment of FIG. 9A from a second perspective.

FIG. 9A is a first perspective view of a smart sensor device 120 that includes a circular antenna structure 100. FIG. 9B is a second perspective view of the smart sensor device 120 of FIG. 9A. In the present disclosure, FIGS. 9A-9B may be individually or collectively referred to as FIG. 9. Structures earlier identified are not necessarily repeated for brevity.

The smart sensor device 120 of FIG. 9 is along the lines of the smart sensor device 120 of FIG. 5. The smart sensor device 120 illustrated in FIG. 9 is shown without the housing 122 and without the light transmissive surface 126 represented in FIG. 5. The smart sensor device 120 of FIG. 9 is arranged as a smart light controller having cellular connectivity to a remote computing server 210 (FIG. 1). In some cases, the smart sensor device 120 of FIG. 9 is along the lines of the smart sensor devices 120 used in the system level deployment 200 of FIG. 1.

The smart sensor device 120 includes a base section 132. According to this embodiment, the base section has a generally circular perimeter arranged to mate with a lower portion of the generally cylindrical housing 122. In at least some cases, the base section 132 has a connector 124 (FIG. 5) integrated therein. One or more gasket structures may be included in the base section 132 to form a seal between the base section 132 and the generally cylindrical housing 122 and thereby protect electronic circuitry of the smart sensor device 120 from rain, humidity, particulate matter, and other undesirable foreign contamination.

A high voltage section 134 of the smart sensor device 120 is formed on a generally circular circuit board "above" the base section 132. The high voltage section 134 may include a stray voltage detection circuit, utility-grade power metering circuitry, and switching circuitry to direct a light source of an associated luminaire to turn on and turn off at an appointed time. The high-voltage section 134 may optionally include other circuits.

"Above" the high voltage section, the smart sensor device 120 includes a power supply section 136. The power supply section includes a switching power supply that is arranged to generate any suitable number of low voltage power signals used in the smart sensor device 120. It is recognized by the inventors that the power supply section 136 produces a level of electromagnetic field noise that is known to be undesirable in proximity to circuits that operate with high-frequency signals.

"Above" the power supply section 136, a processing section 138 includes cellular transceiver circuitry, location-based processing circuitry, embedded processor circuitry, memory, general purpose input/output circuits, a light sensor, and the like. In some cases, the processing section 138 may optionally include wireless LAN circuitry (e.g., communication components organized according to a WIFI protocol). Other optional circuits are also contemplated. Generally, the embedded processor circuitry cooperatively retrieves executable software instructions from the memory, which, when executed, direct operations of the smart sensor device. The operations may include collecting information from the light sensor, producing control signals for the light source of the luminaire, directing transmission of data to a remote computing server 210 (FIG. 1) through the circular antenna structure 100, directing receipt of data from a remote computing server 210 or some other device through the circular antenna structure 100 and processing of such data, and performing many other actions and functions.

The configuration of the sensor device 120 illustrated in FIG. 9 shows the various sections of the device 120 in a stacked arrangement within the housing 122. In such an arrangement, the antenna elements 104a-104c are positioned upon or otherwise integrated with a first or top surface of the substrate 102, which surface is separated from a second or bottom surface of the substrate 102 by a thickness of the substrate 102. The processing section 138 is positioned or located opposite, but not in physical contact with, the bottom surface of the substrate 102. The power supply section 136 is positioned such that it is located opposite, but not in physical contact with, a bottom surface of the processing section 138. The bottom surface of the processing section 136 is the surface opposite the surface upon which the light-responsive circuitry (e.g., photosensor 901) is positioned. The high voltage section 134 is positioned such that it is located opposite, but not in physical contact with, a bottom surface of the power supply section 136. Finally, the base section 132 is positioned such that it is located opposite a bottom surface of the high voltage section 134. In one exemplary embodiment, a transverse axis 701 (see FIG. 7B) through a center of the antenna-supporting substrate 102 generally aligns with a longitudinal axis 902 through a center of the housing 122.

To reduce undesirable effects of EMF noise produced in the power supply section 136 on high frequency signals passed through the circular antenna 100, the processing section 138 may include a circuit board having a large ground plane. Because the large ground plane of the circuit board of the processing section 138 and the metal of the circular antenna 100 may form an undesirable parasitic capacitive circuit between the radiative antenna elements and ground, the circular antenna 100 is arrange for placement a desirable distance "above" the circuit board of the processing section 138 as described with respect to distance measurement icons 130c, 130d in FIG. 6.

The various layers of the smart sensor device 120 may be described as "above" one another, "below" one another, or the like. One of skill in the art will recognized that terms such as "above" and "below" are terms of relative position and not absolute position. More specifically, even though one layer of the stack (e.g., base section 132, high voltage section 134, power supply section 136, processing section 138, circular antenna 100) is absolutely above another layer when the smart sensor device 120 is deployed in the top of a street light luminaire, the same arrangements may still be considered "above" and "below," as the case may be, when the smart sensor device 120 is deployed in a different orientation.

The smart sensor device 120 embodiment of FIGS. 9 and 10 show an embodiment of the circular antenna structure 100, but the embodiments do not show any signal conduction medium 114 structures. In some cases, signal conduction medium 114 structures are deployed. In other cases, the radiative antenna elements 104 of the circular antenna structure 100 may be electrically coupled to suitable locations of the processing section 138 via spring contacts, a header receptacle and pins, or via some other direct physical and wireless connection path.

In the smart sensor device 120 embodiment of FIG. 9, one of ordinary skill in the art will recognize that alignment structures 108, notches, apertures, and other registration features are used to help align the layers of the stack (e.g., base section 132, high voltage section 134, power supply section 136, processing section 138, circular antenna 100) during manufacturing construction. Various headers and pin connectors are aligned and electrically coupled, which permit passing power and data signals from one layer to another. The stack of layers is physically coupled together via the mounting structures 106, which may include screws, nuts, bolts, standoffs, any other such structures. The presence of the substantially rigid substrate 102 may optionally improve the mechanical stability of the smart sensor device 120. Accordingly, a desirable level of rigidity may be implemented (e.g., via a thicker substrate 102, stronger or more durable materials of the substrate 102, and the like) to thereby improve the reliability over time of the smart sensor device 120.

The smart sensor device 120 includes a plurality of EMF shield contacts 118. The EMF shield contacts are optionally included at any desirable locations on or about the high voltage section 134, power supply section 136, and the processing section 138. One or more of the EMF shield contacts 118 are electrically coupled to a ground plane of the smart sensor device 120. In some cases, the EMF shield contacts 118 are electrically coupled to the first radiative antenna element 104a.

In another alternative embodiment, the antenna-supporting substrate 102 and/or the aperture 110, film, panel, lens, or other light transmissive feature of the substrate 102 may be implemented in various other shapes and sizes, including rectangular, rounded rectangular, oval, or any other shape or series or arrangement of shapes the permits a desired amount of light to pass through the substrate 102 to a photosensor 901 (e.g., photocell) or other light-responsive circuitry that may be positioned below the substrate in a stacked arrangement as shown in exemplary form in FIG. 9. According to one alternative embodiment as illustrated in FIG. 9A, the interruption (e.g., aperture 110) in the antenna-supporting substrate 102 may be sized and shaped or otherwise configured to provide the photosensor a field of view 903 in the range of about 90 degrees to about 120 degrees.

Figure 10A:
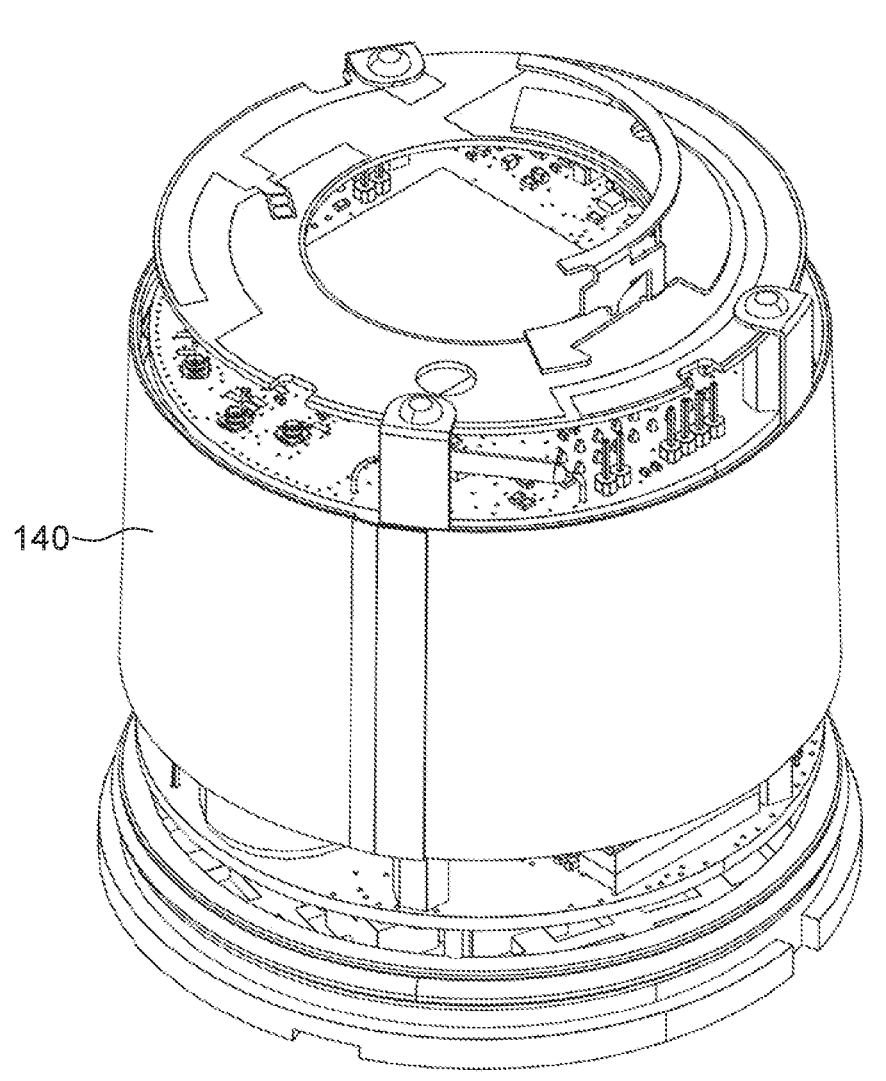
FIG. 10A is the smart sensor device embodiment of FIG. 9 with an optional cylindrical electromagnetic field (EMF) shield.
Figure 10B:
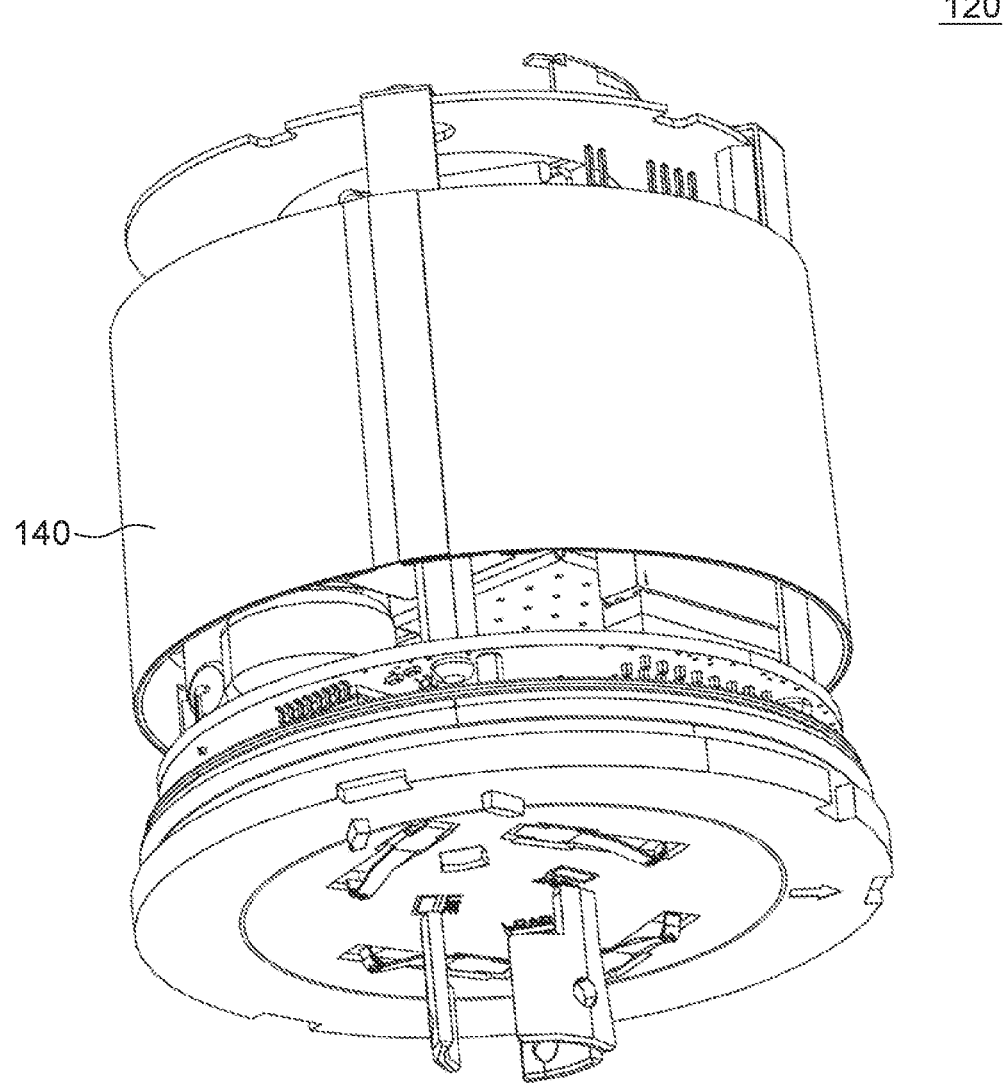
FIG. 10B is the smart sensor device embodiment of FIG. 10A from a different perspective.

FIG. 10A is the smart sensor device 120 embodiment of FIG. 9 with an optional electromagnetic field (EMF) shield 140. FIG. 10B is the smart sensor device 120 embodiment of FIG. 10A from a different perspective. In the present disclosure, FIGS. may be individually or collectively referred to as FIG. 10. Structures earlier identified are not necessarily repeated for brevity.

The optional EMF shield 140 is arranged as a flexible foil or other material with electrically conductive properties. When deployed around certain layers (e.g., the high voltage section 134, the power supply section 136, and the processing section 138) of the smart sensor device 120, the EMF shield 140 makes electrical contact with one or more of the EMF shield contacts 118 (FIG. 9). In embodiments where the first radiative antenna element 104a (FIGS. 7, 8) is arranged as a ground plane, the optional EMF shield 140 may be electrically coupled to the first radiative antenna element 104a via one or more of the EMF shield contacts 118. The EMF shield contacts 118 may be spring steel, tabs, or any other suitable material and structure. When deployed, the EMF shield 140 is arranged in at least some embodiments as an EMF noise reduction structure to shield or otherwise attenuate EMF noise produced in at least the power supply section 136 from the high-frequency RF structures of the processing layer 138 and antenna 100. In other embodiments contemplated herein, the EMF shield 140 may be arranged to capacitively cooperate with the first radiative antenna element 104a to operate as a counterpoise for the primary cellular antenna or another antenna structure in the smart sensor device 120. The EMF shield 140 may be configured in any geometry necessary to provide effective shielding for the processing section 138 and the power supply section 136 and to electrically connect to the sets of shield contacts 118 positioned about the peripheries of the processing section 138 and the power supply section 136.

Figure 11:
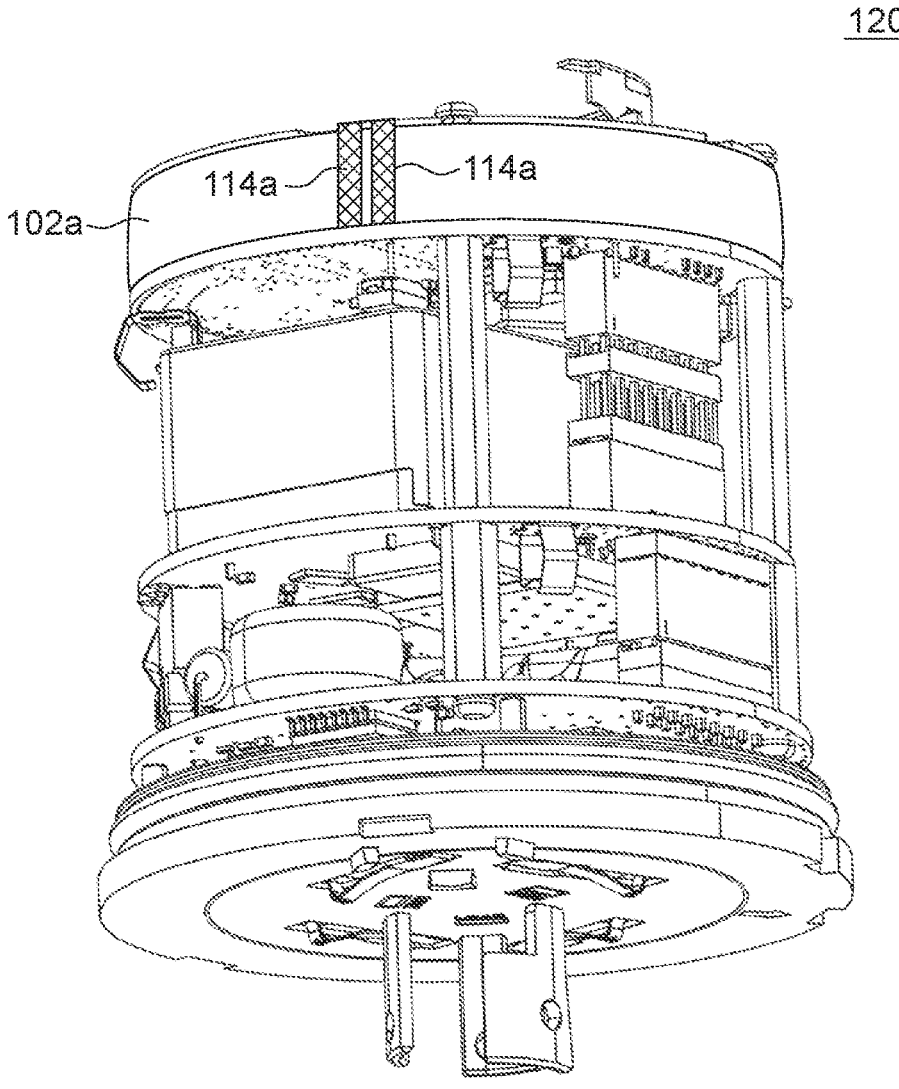
FIG. 11 is yet one more smart sensor device embodiment with an optional substrate for passing RF signals between antenna elements and a processing section.

FIG. 11 illustrates yet one more smart sensor device 120 embodiment with an optional thick substrate 102a. Structures earlier identified are not necessarily repeated for brevity. The embodiment of FIG. 11 includes a circular antenna structure having a thick substrate 102a. The thick substrate 102a is substantially rigid and along the lines of other substrate embodiments described herein except that substrate 102a has a thickness between about one-half inch (0.50 in. or 500 mils) and about two inches (2.0 in.). The thick substrate 102a has a radius that is between about three-fourths of an inch (0.75 in.) and about four inches (4 in.). In at least one case, the substrate 102a has a radius of about one and one-half inch (1.5 in.) and a thickness of about of about sixty-tenths of an inch (0.60 in or 600 mils).

The circular antenna structure of FIG. 11 also includes signal conduction medium structures 114a that are etched, deposited, or otherwise formed on the surface of the thick substrate 102a. These signal conduction medium structures 114a electrically couple antenna structures to underlying circuitry of the processing section 138 (FIGS. 9, via pads, spring biased tabs, or some other electrical coupling means. It is recognized that by forming a circular antenna with a thick substrate 102a, signal conduction medium structures 114 (FIG. 8) that are formed as cable, wire, or the like may be avoided, and signal integrity and device reliability may be improved.

Various figures in the present disclosure illustrate portions of one or more non-limiting computing device embodiments such as one or more components of a smart sensor device 120. The computing devices may include operative hardware found in conventional computing device apparatuses such as one or more processors, volatile and non-volatile memory, serial and parallel input/output (I/O) circuitry compliant with various standards and protocols, wired and/or wireless networking circuitry (e.g., a communications transceiver), one or more user interface (UI) modules, logic, and other electronic circuitry.

Processing devices, or "processors," as described herein, include central processing units (CPU's), microcontrollers (MCU), digital signal processors (DSP), application specific integrated circuits (ASIC), peripheral interface controllers (PIC), state machines, and the like. Accordingly, a processor as described herein includes any device, system, or part thereof that controls at least one operation, and such a device may be implemented in hardware, firmware, or software, or some combination of at least two of the same. The functionality associated with any particular processor may be centralized or distributed, whether locally or remotely. Processors may interchangeably refer to any type of electronic control circuitry configured to execute programmed software instructions. The programmed instructions may be high-level software instructions, compiled software instructions, assembly-language software instructions, object code, binary code, micro-code, or the like. The programmed instructions may reside in internal or external memory or may be hard-coded as a state machine or set of control signals. According to methods and devices referenced herein, one or more embodiments describe software executable by the processor, which when executed, carries out one or more of the method acts.

As known by one skilled in the art, a computing device has one or more memories, and each memory comprises any combination of volatile and non-volatile computer-readable media for reading and writing. Volatile computer-readable media includes, for example, random access memory (RAM). Non-volatile computer-readable media includes, for example, read only memory (ROM), magnetic media such as a hard-disk, an optical disk, a flash memory device, a CD-ROM, and/or the like. In some cases, a particular memory is separated virtually or physically into separate areas, such as a first memory, a second memory, a third memory, etc. In these cases, it is understood that the different divisions of memory may be in different devices or embodied in a single memory. The memory in some cases is a non-transitory computer medium configured to store software instructions arranged to be executed by a processor. Some or all of the stored contents of a memory may include software instructions executable by a processing device to carry out one or more particular acts.

The computing devices illustrated herein may further include operative software found in a conventional computing device such as an operating system or task loop, software drivers to direct operations through I/O circuitry, networking circuitry, and other peripheral component circuitry. In addition, the computing devices may include operative application software such as network software for communicating with other computing devices, database software for building and maintaining databases, and task management software where appropriate for distributing the communication and/or operational workload amongst various processors. In some cases, the computing device is a single hardware machine having at least some of the hardware and software listed herein, and in other cases, the computing device is a networked collection of hardware and software machines working together in a server farm to execute the functions of one or more embodiments described herein. Some aspects of the conventional hardware and software of the computing device are not shown in the figures for simplicity.

When so arranged as described herein, each computing device may be transformed from a generic and unspecific computing device to a combination device arranged comprising hardware and software configured for a specific and particular purpose such as to provide a determined technical solution. When so arranged as described herein, to the extent that any of the inventive concepts described herein are found by a body of competent adjudication to be subsumed in an abstract idea, the ordered combination of elements and limitations are expressly presented to provide a requisite inventive concept by transforming the abstract idea into a tangible and concrete practical application of that abstract idea.

Software of a smart sensor device 120 may include a fully executable software program, a simple configuration data file, a link to additional directions, or any combination of known software types. When a computing device updates software, the update may be small or large. For example, in some cases, a computing device downloads a small configuration data file to as part of software, and in other cases, a computing device completely replaces most or all of the present software on itself or another computing device with a fresh version. In some cases, software, data, or software and data is encrypted, encoded, and/or otherwise compressed for reasons that include security, privacy, data transfer speed, data cost, or the like.

Database structures, if any are present in the smart sensor device 120 embodiments described herein, may be formed in a single database or multiple databases. In some cases hardware or software storage repositories are shared amongst various functions of the particular system or systems to which they are associated. A database may be formed as part of a local system or local area network. Alternatively, or in addition, a database may be formed remotely, such as within a distributed "cloud" computing system, which would be accessible via a wide area network or some other network.

Input/output (I/O) circuitry and user interface (UI) modules include serial ports, parallel ports, universal serial bus (USB) ports, IEEE 802.11 transceivers and other transceivers compliant with protocols administered by one or more standard-setting bodies, displays, projectors, printers, keyboards, computer mice, microphones, micro-electro-mechanical (MEMS) devices such as accelerometers, and the like.

In at least one embodiment, devices such as the smart sensor device 120 may communicate with other devices via communication over a network. The network may involve an Internet connection or some other type of local area network (LAN) or wide area network (WAN). Non-limiting examples of structures that enable or form parts of a network include, but are not limited to, an Ethernet, twisted pair Ethernet, digital subscriber loop (DSL) devices, wireless LAN, Wi-Fi, Worldwide Interoperability for Microwave Access (WiMax), or the like.

In the present disclosure, memory may be used in one configuration or another. The memory may be configured to store data. In the alternative or in addition, the memory may be a non-transitory computer readable medium (CRM). The CRM is configured to store computing instructions executable by a processor of the smart sensor device 120. The computing instructions may be stored individually or as groups of instructions in files. The files may include functions, services, libraries, and the like. The files may include one or more computer programs or may be part of a larger computer program. Alternatively or additionally, each file may include data or other computational support material useful to carry out the computing functions of a smart sensor device 120 or a remote computing system.

In the absence of any specific clarification related to its express use in a particular context, where the terms "substantial" or "about" in any grammatical form are used as modifiers in the present disclosure and any appended claims (e.g., to modify a structure, a dimension, a measurement, or some other characteristic), it is understood that the characteristic may vary by up to 30 percent. For example, a substrate 102 of a smart sensor device 120 having a particular linear dimension of "between about three (3) inches and five (5) inches" includes such devices in which the linear dimension varies by up to 30 percent, Accordingly, the particular linear dimension of the substrate 102 may be between one point five (1.5) inches and six point five (6.5) inches.

Where a range of values is provided, it is understood that each intervening value, to the tenth of the unit of the lower limit unless the context clearly dictates otherwise, between the upper and lower limit of that range and any other stated or intervening value in that stated range is encompassed within the invention. The upper and lower limits of these smaller ranges may independently be included in the smaller ranges is also encompassed within the invention, subject to any specifically excluded limit in the stated range. Where the stated range includes one or both of the limits, ranges excluding either or both of those included limits are also included in the invention.

Unless defined otherwise, the technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein.

In the present disclosure, when an element (e.g., component, circuit, device, apparatus, structure, layer, material, or the like) is referred to as being "on," "coupled to," or "connected to" another element, the elements can be directly on, directly coupled to, or directly connected to each other, or intervening elements may be present. In contrast, when an element is referred to as being "directly on," "directly coupled to," or "directly connected to" another element, there are no intervening elements present.

The terms "include" and "comprise" as well as derivatives and variations thereof, in all of their syntactic contexts, are to be construed without limitation in an open, inclusive sense, (e.g., "including, but not limited to"). The term "or," is inclusive, meaning and/or. The phrases "associated with" and "associated therewith," as well as derivatives thereof, can be understood as meaning to include, be included within, interconnect with, contain, be contained within, connect to or with, couple to or with, be communicable with, cooperate with, interleave, juxtapose, be proximate to, be bound to or with, have, have a property of, or the like.

Reference throughout this specification to "one embodiment" or "an embodiment" and variations thereof means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the present disclosure, the terms first, second, etc., may be used to describe various elements, however, these elements are not limited by these terms unless the context clearly requires such limitation. These terms are only used to distinguish one element from another. For example, a first machine could be termed a second machine, and, similarly, a second machine could be termed a first machine, without departing from the scope of the inventive concept.

The singular forms "a," "an," and "the" in the present disclosure include plural referents unless the content and context clearly dictates otherwise. The conjunctive terms, "and" and "or" are generally employed in the broadest sense to include "and/or" unless the content and context clearly dictates inclusivity or exclusivity as the case may be. The composition of "and" and "or" when recited herein as "and/or" encompasses an embodiment that includes all of the elements associated thereto and at least one more alternative embodiment that includes fewer than all of the elements associated thereto.

In the present disclosure, conjunctive lists make use of a comma, which may be known as an Oxford comma, a Harvard comma, a serial comma, or another like term. Such lists are intended to connect words, clauses or sentences such that the thing following the comma is also included in the list.

The headings and Abstract of the Disclosure provided herein are for convenience only and do not interpret the scope or meaning of the embodiments.

In cases where an antenna is used in a device that controls the operation of a streetlight, the streetlight controller may be arranged, in at least some embodiments, in a generally cylindrical housing. The generally cylindrical housing will have a base with integrated connector "pins." When the streetlight controller is deployed, the connector pins mate with a corresponding receptacle that is integrated in a streetlight, a luminaire, a control box, or some other structure. In cases where the streetlight controller provides wireless communication features, embodiments of the circular antenna structures described herein may be suitably arranged in the cylindrical housing. The substrate of the circular antenna structure may be formed to provide mechanical stability to the electronic component structures of the streetlight controller. The substrate may be formed as a platform that supports one or more radio frequency (RF) antenna components. The substrate of the circular antenna structure may be formed as a "donut" with a "hole" that permits ambient light to reach a light sensor mounted below the circular antenna structure. Other features, benefits, and utilitarian effects of the circular antenna embodiments described herein are evident in the present disclosure.

The conventional antennas that permit wireless RF communications are insufficient in at least some cases. The present inventor has recognized that certain devices may be more reliably and predictably manufactured and deployed using the inventive circular antennas, methods, and systems (i.e., the teaching of this present disclosure) described herein, and once and deployed, these circular antennas may provide as good or more reliable, predictable RF communications than conventional antennas.

Certain wireless communication devices of the type described herein are often, but not exclusively, arranged for omnidirectional communications. It is recognized that omnidirectional communications include communications that are substantially omnidirectional, but not completely omnidirectional. For example, omnidirectional communications include implementations where at least some RF signal is attenuated or completely blocked by a structure (e.g., building, sign, tower, pole, support, luminaire, or the like), foliage (e.g., trees, bushes, vines, or the like), or some other manmade or naturally occurring obstruction. In this respect, the wireless communication devices of the present disclosure, in at least some cases, do not beam-form or otherwise aim the RF signal, but instead, the RF signal is propagated or received, as the case may be, in the unobstructed region about the device's radiative antenna element.

The antenna structures described in the present disclosure provide several technical effects and advances to the field of radio frequency (RF) communications.

Technical effects and benefits include improvements in the reliability of RF communications, particularly in aerially mounted devices and structures. The circular antenna may include a substrate that provides mechanical stability for other electronic components integrated in the operative device. For example, when two or more circuit boards are arranged in a "stack," the substrate of the circular antenna may also be included in the stack and formed with any desirable thickness, rigidity, material, size, mounting structures, and the like, to keep the two or more circuit boards from bending, twisting, sagging, or deforming in some other way. Another technical effect and benefit of at least some of the circular antennas described herein includes providing a substantially planar surface on which to form or otherwise location one or more radiating or radiative structures. When deployed, the planar surface may be arranged substantially parallel to the ground. The radiating or radiative structures may be arranged for directional or omnidirectional RF communications. In at least some embodiments, the circular antenna is mounted at the top of a light control structure, and an aperture in the circular antenna structure permits light to reach a light sensor mounted below the circular antenna.

The present disclosure sets forth details of various structural embodiments that may be arranged to carry the teaching of the present disclosure. To exploit the advantages that a circular antenna may provide, a number of exemplary systems, methods, and devices are now disclosed.

The various embodiments described above can be combined to provide further embodiments. Various features of the embodiments are optional, and features of one embodiment may be suitably combined with other embodiments. Aspects of the embodiments can be modified, if necessary to employ concepts of the various patents, application and publications to provide yet further embodiments.

Example A-1 is a circular antenna, comprising a substantially rigid substrate formed having a substantially certain radius between about three-fourths of an inch (0.75 in.) and about four inches (4 in.), the substantially rigid substrate also having a substantially certain thickness between about 0.05 inches and about 0.50 inches; and a radiative antenna element integrated with the substantially rigid substrate.

Example A-2 may include the subject matter of Example A-1, and alternatively or additionally any other example herein, the radiative antenna is a primary cellular antenna arranged to pass signals at frequencies between 600 megahertz (600 MHz) and three gigahertz (3 GHz).

Example A-3 may include the subject matter of Example A-2, and alternatively or additionally any other example herein, wherein the radiative antenna is a primary cellular antenna arranged to pass signals at frequencies between 703 MHz and 2690 MHz.

Example A-4 may include the subject matter of any of Examples A-1 to A-3, and alternatively or additionally any other example herein, and further comprise a second radiative antenna element integrated with the substantially rigid substrate.

Example A-5 may include the subject matter of Example A-4, and alternatively or additionally any other example herein, wherein the second radiative antenna arranged to receive location-based signals from one or more satellites of a satellite constellation system that provides geographic location information.

Example A-6 may include the subject matter of Example A-4, and alternatively or additionally any other example herein, wherein the second radiative antenna is a cellular diversity antenna element arranged to receive cellular frequency signals present in the air in proximity to the circular antenna.

Example A-7 may include the subject matter of any of Examples A-1 to A-3, and alternatively or additionally any other example herein, and further comprise a second radiative antenna element integrated with the substantially rigid substrate, wherein the second radiative antenna is arranged to receive location-based signals from one or more satellites of a satellite constellation system that provides geographic location information; and a third radiative antenna element integrated with the substantially rigid substrate, wherein the third radiative antenna is arranged to receive cellular frequency signals present in the air in proximity to the circular antenna.

Example A-8 may include the subject matter of any of Examples A-1 to A-66, and alternatively or additionally any other example herein, wherein the substantially rigid substrate includes at least one interruption arranged to permit light to reach an area that would otherwise be shielded by the substantially rigid substrate.

Example A-9 may include the subject matter of Example A-8, and alternatively or additionally any other example herein, wherein the at least one interruption is an aperture.

Example A-10 may include the subject matter of Example A-8, and alternatively or additionally any other example herein, wherein the at least one interruption is a lens.

Example A-11 may include the subject matter of Example A-8, and alternatively or additionally any other example herein, wherein the substantially rigid substrate is formed from a light-transmissive material.

The various embodiments described above can be combined to provide further embodiments. Aspects of the embodiments can be modified, if necessary to employ concepts of the various patents, application and publications to provide yet further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. An antenna comprising:
a generally circular, substantially rigid substrate;
a first antenna element integrated with the substrate, wherein the first antenna element is a primary cellular antenna arranged to pass cellular frequency signals over a cellular network:
a second antenna element integrated with the substrate, wherein the second antenna element is arranged to receive location-based signals from one or more satellites of a satellite constellation system that provides geographic location information; and
a third antenna element integrated with the substrate, wherein the third antenna element is arranged as a diversity antenna to receive cellular frequency signals from the cellular network.

2. The antenna of claim 1, wherein the first antenna element is arranged to pass signals at frequencies between 600 megahertz (600 MHz) and three gigahertz (3 GHz).

3. The antenna of claim 1, wherein the first antenna element is arranged to pass signals at frequencies between 703 MHz and 2690 MHz.

4. The antenna of claim 1, wherein the substrate has a radius between about three-fourths of an inch (0.75 in.) and about four inches (4 in.) and a thickness between about 0.05 inches (50 mils) and about one-half inch (0.50 in. or 500 mils).

5. The antenna of claim 1, wherein the substrate includes at least one interruption arranged to permit light to reach an area that would otherwise be shielded by the substrate.

6. The antenna of claim 5, wherein the at least one interruption is an aperture.

7. The antenna of claim 5, wherein the at least one interruption is a lens.

8. The antenna of claim 5, wherein at least the first antenna element is integrated with the substrate so as to avoid the at least one interruption.

9. The antenna of claim 1, wherein the substrate is formed from a light-transmissive material.

10. The antenna of claim 1, wherein the first antenna element permits omnidirectional communications.

11. The antenna of claim 1, wherein the substrate defines an aperture through a center thereof to permit light to reach an area that would otherwise be shielded by the substrate.

12. An antenna comprising:
a generally circular, substantially rigid substrate including an interruption arranged to permit light to reach an area that would otherwise be shielded by the substrate;
a first antenna element integrated with the substrate so as to avoid the interruption, wherein the first antenna element is a primary cellular antenna arranged to pass cellular frequency signals over a cellular network;
a second antenna element integrated with the substrate, wherein the second antenna element is arranged to receive location-based signals from one or more satellites of a satellite constellation system that provides geographic location information; and
a third antenna element integrated with the substrate, wherein the third antenna element is arranged as a diversity antenna to receive cellular frequency signals from the cellular network.

13. The antenna of claim 12, wherein the first antenna element is arranged to pass signals at frequencies between 600 megahertz (600 MHZ) and three gigahertz (3 GHz).

14. The antenna of claim 12, further comprising: wherein the substrate has a radius between about three-fourths of an inch (0.75 in.) and about four inches (4 in.), and a thickness between about 0.05 inches (50 mils) and about one-half inch (0.50 in. or 500 mils.

\* \* \* \* \*